United States Patent
Kastrup et al.

(10) Patent No.: US 12,433,916 B2
(45) Date of Patent: Oct. 7, 2025

(54) CELL BANK OF HIGH CONCENTRATION ADIPOSE-DERIVED STEM CELL COMPOSITION AND RELATED METHODS

(71) Applicant: Rigshospitalet, Copenhagen Ø (DK)

(72) Inventors: Jens Kastrup, Birkerød (DK); Annette Ekblond, Birkerød (DK); Mandana Haack-Sørensen, Vanløse (DK)

(73) Assignee: Rigshospitalet, Copenhagen (DK)

( * ) Notice: Subject to any disclaimer, the term of this patent is extended or adjusted under 35 U.S.C. 154(b) by 734 days.

(21) Appl. No.: 15/769,873

(22) PCT Filed: Oct. 21, 2016

(86) PCT No.: PCT/EP2016/075407
§ 371 (c)(1),
(2) Date: Apr. 20, 2018

(87) PCT Pub. No.: WO2017/068140
PCT Pub. Date: Apr. 27, 2017

(65) Prior Publication Data
US 2018/0325957 A1     Nov. 15, 2018

(30) Foreign Application Priority Data
Oct. 23, 2015   (EP) .................................... 15191213

(51) Int. Cl.
*A61K 35/28*     (2015.01)
*A61K 9/00*      (2006.01)
*A61K 38/19*     (2006.01)
*A61P 3/10*      (2006.01)
*A61P 19/02*     (2006.01)
*A61P 19/08*     (2006.01)
*A61P 29/00*     (2006.01)
*A61P 37/06*     (2006.01)
*C12N 5/0775*    (2010.01)

(52) U.S. Cl.
CPC ............ *A61K 35/28* (2013.01); *A61K 9/0019* (2013.01); *A61K 38/19* (2013.01); *A61P 29/00* (2018.01); *A61P 37/06* (2018.01); *C12N 5/0667* (2013.01); *A61P 3/10* (2018.01); *A61P 19/02* (2018.01); *A61P 19/08* (2018.01); *C12N 2500/34* (2013.01); *C12N 2500/38* (2013.01); *C12N 2500/40* (2013.01); *C12N 2500/44* (2013.01); *C12N 2500/60* (2013.01); *C12N 2500/62* (2013.01); *C12N 2500/84* (2013.01)

(58) Field of Classification Search
CPC ...... A61K 35/28; A61K 9/0019; A61K 38/19; A61P 29/00; A61P 37/06; A61P 3/10; A61P 19/02; A61P 19/08; C12N 5/0667; C12N 2500/34; C12N 2500/38; C12N 2500/40; C12N 2500/44; C12N 2500/60; C12N 2500/62; C12N 2500/84
See application file for complete search history.

(56) References Cited

U.S. PATENT DOCUMENTS

| | | | |
|---|---|---|---|
| 6,492,103 B1 * | 12/2002 | Taylor | A01N 1/02 435/1.2 |
| 9,598,673 B2 | 3/2017 | Ichim | |
| 2009/0304654 A1 | 12/2009 | Lue et al. | |
| 2015/0240211 A1 * | 8/2015 | Coleman | A01N 1/0284 435/374 |
| 2018/0236003 A1 * | 8/2018 | Banerjee | A61P 17/02 |

FOREIGN PATENT DOCUMENTS

| | | | |
|---|---|---|---|
| CN | 104357382 A | 2/2015 | |
| WO | WO 00/02572 A1 | 1/2000 | |
| WO | WO 2006/037649 A1 | 4/2006 | |
| WO | WO 2006/136244 A2 | 12/2006 | |
| WO | WO 2007/011797 A2 | 1/2007 | |
| WO | WO 2010/064054 A1 | 6/2010 | |
| WO | WO-2014074859 A1 * | 5/2014 | ........... C12N 5/0667 |
| WO | WO 2014/203267 A2 | 12/2014 | |

OTHER PUBLICATIONS

"Strategies to improve the immunosuppressive properties of human mesenchymal stem cells." Stem cell research & therapy 6.1 (2015): 1-10 (Year: 2015).*
Burnouf et al. "Blood-derived biomaterials and platelet growth factors in regenerative medicine." Blood reviews 27.2 (2013): 77-89 (Year: 2013).*
Luetzkendorf et al. "Cryopreservation does not alter main characteristics of good manufacturing process-grade human multipotent mesenchymal stromal cells including immunomodulating potential and lack of malignant transformation." Cytotherapy 17.2 (2015): 186-198 (Year: 2015).*
Dhanasekaran et al. "Plasticity and banking potential of cultured adipose tissue derived mesenchymal stem cells." Cell and tissue banking 14.2 (2013): 303-315 (Year: 2013).*
Thirumala et al. "A cryopreservation system for direct clinical use of MSC." Cytotherapy 15.4 (2013): 46-7 (Year: 2013).*
Mcintosh et al. "Evaluation of cellular and humoral immune responses to allogeneic adipose-derived stem/stromal cells." Adipose-Derived Stem Cells: Methods and Protocols (2011): 133-150 (Year: 2011).*
Aust, L., et al., "Yield of human adipose-derived adult stem cells from liposuction aspirates," *Cytotherapy*, 2004, vol. 6(1), pp. 7-14.
Bourin, P., et al., "Stromal cells from the adipose tissue-derived stromal vascular fraction and culture expanded adipose tissue-derived stromal/stem cells: a joint statement of the International Federation for Adipose Therapeutics (IFATS) and Science and the International Society for Cellular Therapy," *Cytotherapy*, 2013, vol. 15(6), pp. 641-648.

(Continued)

*Primary Examiner* — Fereydoun G Sajjadi
*Assistant Examiner* — Alexander W Nicol
(74) *Attorney, Agent, or Firm* — Womble Bond Dickinson (US) LLP

(57) ABSTRACT

The present invention relates to adipose-derived stem cells (ASCs) and compositions, as well as methods for preparing and using such ASCs and compositions for therapy.

13 Claims, 1 Drawing Sheet

(56) References Cited

OTHER PUBLICATIONS

Brzoska, M., et al., "Epithelial differentiation of human adipose tissue-derived adult stem cells," *Biochemical and Biophysical Research Communications*, 2005, vol. 330, pp. 142-150.

"Cryostor™ Quick Reference Cryopreservation Protocol," BioLife Solutions, 2012, 1 page, retrieved from Internet, url:http://web.archive.org/web/20120619212341/http://biolifesolutions.com/biopreservation-media/Protocol.

De Ugarte, D., et al., "Comparison of Multi-Lineage Cells from Human Adipose Tissue and Bone Marrow," *Cells Tissues Organs*, 2003, vol. 1174, pp. 101-109.

Dhanasekaran, M., et al.,"Plasticity and banking potential of cultured adipose tissue derived mesenchymal stem cells," *Cell Tissue Bank*, 2013,vol. 14, pp. 303-315.

Dominici, M., et al., "Minimal criteria for defining mutipotent mesenchymal stromal cells. The International Society for Cellular Therapy position statement," *Cytotherapy*, 2006, vol. 8(4), pp. 315-317.

Farance, I., et al., "Cryopreserved hMSCs Maintain Comparable In Vitro Functional Activity Compared to Fresh hMSCs," *Cytotherapy*, 2015, vol. 6(S), pp. S67-S68, Abstract.

Follin, B., et al., "Identical effects of VEGF and serum-deprivation on phenotype and function of adipose-derived stromal cells from healthy donors and patients with ischemic heart disease," *Journal of Translational Medicine*, 2013, vol. 11(219), pp. 1-14.

Follin, B., et al., "Human adipose-derived stromal cells in a clinically applicable injectable alginate hydrogel: Phenotypic and immunomodulatory evaluation," *Cytotherapy*, 2015, vol. 17, pp. 1104-1118.

François, M., et al., "Cryopreserved mesenchymal stromal cells display impaired immunosuppressive properties as a result of heat-shock response and impaired interferon-y licensing," *Cytotherapy*, 2012, vol. 14, pp. 147-152.

Gebler, A., et al., "The immunomodulatory capacity of mesenchymal stem cells," *Trends in Molecular Medicine*, 2012, vol. 18(2), pp. 128-134.

Goh, B., et al., "Cryopreservation characteristics of adipose-derived stem cells: maintenance of differentiation potential and viability," *Journal of Tissue Engineering and Regenerative Medicine*, 2007, vol. 1, pp. 322-324.

Halvorsen, Y., et al., "Thiazolidinediones and Glucocorticoids Synergistically Induce Differentiation of Human Adipose Tissue Stromal Cells: Biochemical, Cellular, and Molecular Analysis," *Metabolism*, 2001, vol. 50(4), pp. 407-413.

Jensen, S., et anon., "Differential inductin of inflammatory cytokines by dendritic cells treated with novel TLR-agonist and cytokine based cocktails: targeting dendritic cells in autoimmunity," *Journal of Inflammation*, 2010, vol. 7(37), pp.

Kang,S., et al., "Improvement of neurological deficits by intracerebral transplantation of human adipose tissue-derived stromal cells after cerebral ischemia in rats," *Experimental Neurology*, 2003, vol. 183, pp. 355-366.

Krampera, M., et al., "Immunological characterization of multipotent mesenchymal stromal cells—The International Society for Cellular Therapy (ISCT) working proposal," *Cytotherapy*, 2013, vol. 15, pp. 1054-1061.

Mathiasen, A., et al., Rationale and design of the first randomized, double-blind, placebo-controlled trial of intramyocardial injection of autologous bone-0marrow derived Mesenchymal Stromal Cells in chronic ischemic Heart Failure (MSC-HF Trial), *American Heart Journal*, 2012, vol. 164(3), pp. 285-291.

Mathiasen, A., et al., "Autotransplantation of mesenchymal stromal cells from bone-marrow to heart in patients with severe stable coronary artery disease and refractory angina—final 3-year follow-up," *International Journal of Cardiology*, 2013, vol. 170, pp. 246-251.

Mestas, J., et anon., "Of Mice and Not Men: Differences between Mouse and Human Immunology," *The Journal of Immunology*, 2004, vol. 182, pp. 2731-2738.

Oishi, K., et al., "Cryopreservation of Mouse Adipose Tissue-Derived Stem-Progenitor Cells," *Cell Transplantation*, 2008, vol. 17, pp. 35-41.

Planat-Benard, V., et al., "Plasticity of Human Adipose Lineage Cells Toward Endothelial Cells," *Circulation*, 2004, vol. 109, pp. 656-663.

Planat-Bénard, V., et al., Spontaneous Cardiomyocyte Differentiation From Adipose Tissue Stroma Cells, *Circulation*, 2004, vol. 94, pp. 223-229.

Qayyum, A., et al., "Adipose-derived mesenchymal stromal cells for chronic myocardial ischemia (MyStromalCell Trial): study design," *Regen. Med.*, 2012, vol. 7(3), pp. 421-428.

Rehman, J., et al., "Secretion of Angiogenic and Antiapoptotic Factors by Human Adipose Stromal Cells," *Circulation*, 2004, vol. 109, pp. r52-r58.

Safford, K., et al., "Nuerogenic differentiation of murine and human adipose-derived stromal cells," *Biochemical and Biophysical Research Communications*, 2002, vol. 294, pp. 371-379.

Seo, M., et al., "Differentiation of human adipose stromal cells into hepatic lineage in vitro and in vivo," *Biochemical and Biophysical Research Communications*, 2005, vol. 328, pp. 258-264.

Strem, B., et al., "Multipotential differentiation of adipose tissue-derived stem cells," *Keio J. Med*, 2005, vol. 54(3), pp. 132-141.

Tavakolinejad, S., et al., "The Effect of Human Platelet-Rich Plasma on Adipose-Derived Stem Cell Proliferation and Osteogenic Differentiation," *Iranian Biomedical Journal*, 2014, vol. 18(3), pp. 151-157.

Wang, Y, et al., "Adipose-derived stem cells are an effective cell candidate for treatment of heart failure: an MR imaging study of rat hearts," *Am J Physiol Heart Circ Physiol*, 2009, vol. 297, pp. H1020-H1031.

Wang, Y., et al., "Plasticity of mesenchymal stem cells in immunomodulation: pathological and therapeutic implications," *nature immunology*, 2014, vol. 15(11), pp. 1009-1016.

Wickham, M., et al., "Multipotent Stromal Cells Derived From the Infrapatellar Fat Pad of the Knee," *Clinical Orthopaedics and Related Research*, 2003, vol. 412, pp. 196-212.

Woods, E., et al., "Water and Cryoprotectant Permeability Characteristics of Isolated Human and Canine Pancreatic Islets," *Cell Transplantation*, 1999, vol. 8, pp. 549-559.

Zuk, P., et al., "Multilineage Cells from Human Adipose Tissue: Implications for Cell-Based Therapies," *Tissue Engineering*, 2001, vol. 7(2), pp. 211-228.

Zuk, P., et al., "Human Adipose Tissue Is a Source of Multipotent Stem Cells," *Molecular Biology of the Cell*, 2002, vol. 13, pp. 4279-4295.

Ginis, I., et al., "Evaluation of Bone Marrow-Derived Mesenchymal Stem Cells After Cryopreservation and Hypothermic Storage in Clinically Safe Medium," *Tissue Engineering*, 2012, vol. 18(6), pp. 453-463.

Miyagi-Shiohira, C., et al., "Cryopreservation of Adipose-Derived Mesenchymal Stem Cells," *Cell Medicine*, 2015, vol. 5, pp. 3-7.

Yañez, R., et al., "Adipose Tissue-Derived Mesenchymal Stem Cells Have In Vivo Immunosuppressive Properties Applicable for the Control of the Graft-Versus-Host Disease," *Stem Cells*, 2006, vol. 24(11), pp. 2582-2591.

Yong, K., et al., "Phenotypic and Functional Characterization of Long-Term Cryopreserved Human Adipose-derived Stem Cells," *Scientific Reports*, 2015, vol. 5(9596), pp. 1-10.

Camilleri, E., et al., "Identification and validation of multiple cell surface markers of clinical-grade adipose-derived mesenchymal stromal cells as novel release criteria for good manufacturing practice-compliant production," *Stem Cell Research & Therapy*, 2016, vol. 7(107), pp. 1-16.

Galipeau, J., et al., "International Society for Cellular Therapy perspective on immune functional assays for mesenchymal stromal cells as potency release criterion for advanced phase clinical trials," *Cytotherapy*, 2016, vol. 18, pp. 151-159.

Thirumala, S., et al., "A Cryopreservation System for Direct Clinical Use of MSC," *Cytotherapy*, 2013, vol. 15(4): 46-47.

* cited by examiner

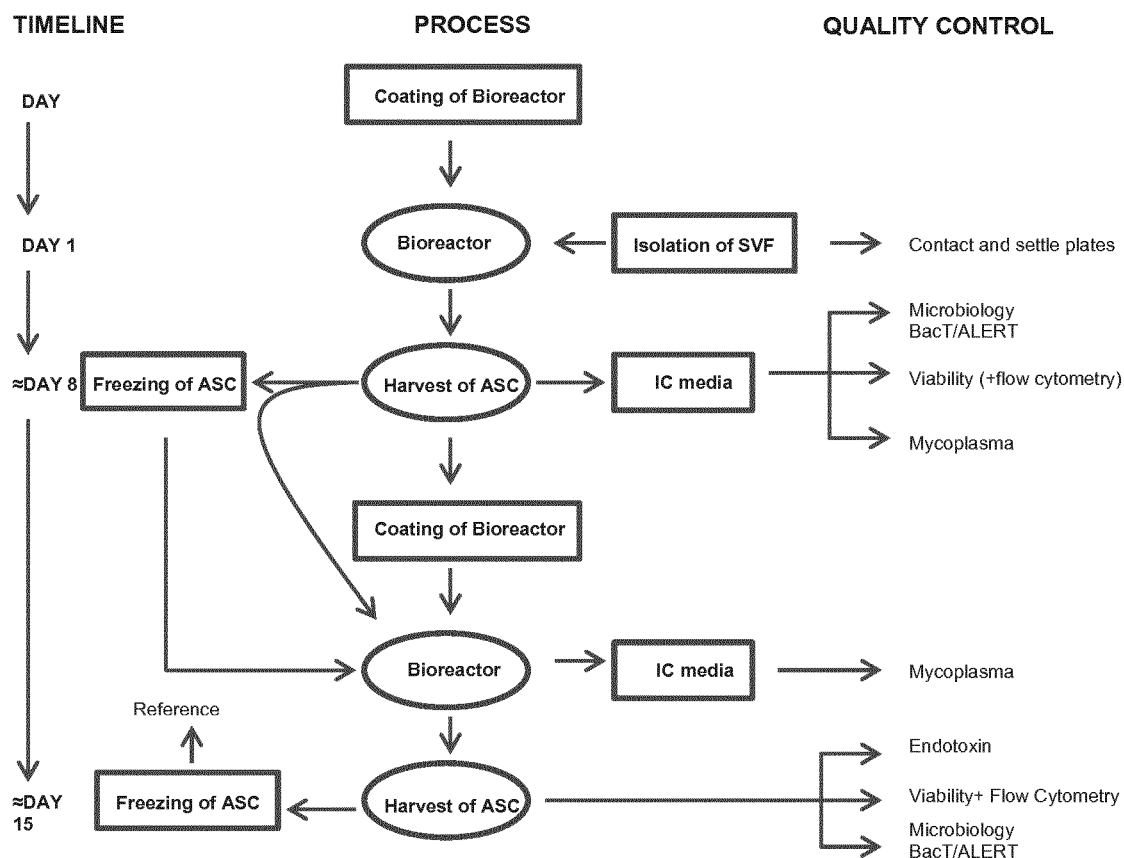

CELL BANK OF HIGH CONCENTRATION ADIPOSE-DERIVED STEM CELL COMPOSITION AND RELATED METHODS

CROSS-REFERENCE TO RELATED APPLICATIONS

This application is a national stage filing under 35 U.S.C. 371 of PCT/EP2016/075407 filed Oct. 21, 2016, which International Application was published by the International Bureau in English on Apr. 27, 2017, and claims priority from European Application No. 15191213.6, filed Oct. 23, 2015, which applications are hereby incorporated by reference in their entirety in this application.

FIELD OF THE INVENTION

The present invention relates to adipose-derived stem cells (ASCs) and compositions, as well as methods for preparing and using such ASCs and compositions for therapy.

BACKGROUND OF THE INVENTION

A multitude of preclinical studies have established that mesenchymal stromal cells from bone marrow (MSCs) as well as adipose tissue have profound regenerative capacities. Mesenchymal stromal cells from both tissue origins improve regeneration through paracrine mechanisms, releasing extracellular substances promoting natural endogenous repair mechanisms including matrix remodelling, revascularisation and immune modulation.

MSCs have proven to be safe and effective in the treatment of severe stable coronary artery disease and refractory angina and chronic ischemic heart failure (e.g., Mathiasen et al., 2012; Mathiasen et al., 2013). The clinical safety of treating chronic myocardial ischemia with ASCs has likewise been documented (Qayyum et al., 2012; Ekblond, 2015). MSCs also have immunosuppressive properties, deriving from their ability to inhibit or halt maturation of dendritic cells and proliferation of T cells, B cells and NK cells, and are being explored for treatment of a variety of autoimmune or other inflammatory disorders (Gebler et al., 2012; Wang et al., 2014).

However, current ASC production methods and clinical logistics are less than optimal, preventing wide dissemination of this type of treatment. So, there is a need for safe and efficient methods for producing and preserving high-quality allogenic ASC preparations suitable for a wide range of therapeutic applications.

WO 2014/203267 (Kaziak Research PVT Ltd.) relates to a method for isolation, purification and industrial scale expansion of human adipose tissue derived MSCs and their use in treating type-1 diabetes mellitus, critical limb ischemia and other disorders.

WO 2006/037649 (Cellerix S. L. and Universidad Autónoma de Madrid) relates to the identification and isolation of multipotent cells from non-osteochondral mesenchymal tissue, characterized by certain markers.

Despite these and other progresses in the art, there is still a need for new manufacturing and formulation technologies for ASCs.

SUMMARY OF THE INVENTION

It has been found by the present inventors that high-quality "off-the-shelf" preparations of ASCs can be efficiently produced and frozen at a high concentration in a protein-free cryoprotectant. The frozen ASC preparations are, when thawed, ready for clinical use. In addition, the ASC preparations have immunosuppressive properties, making them suitable for both autologous and allogeneic use, e.g., in immunosuppressive therapy.

So, in a first aspect the present invention relates to a process preparing a composition comprising a substantially homogenous adult human stem cell population, comprising one or more of the following steps:
(i) adding the stromal vascular fraction (SVF) of a lipoaspirate collected from a donor to a bioreactor, optionally wherein a surface is pre-treated to promote adhesion of ASCs;
(ii) in the bioreactor, cultivating adherent cells to confluence in a serum-free culture medium supplemented with human platelet lysate;
(iii) detaching the adherent cells;
(iv) freezing the detached cells in a cryoprotectant at a concentration of at least $1 \times 10^6$ cells/mL;
(v) thawing the frozen cells and repeating steps (ii) and (iii), and optionally (iv), at least once,
(vi) freezing the detached cells at a concentration of at least $1 \times 10^7$ cells/mL; and (vii) optionally, thawing the frozen composition.

In a second aspect, the invention relates to a composition, such as a pharmaceutical composition, comprising a suspension of a substantially homogenous adult human stem cell population, isolated from adipose tissue collected from a donor, in a protein-free cryoprotectant, wherein the cell concentration is at least $1 \times 10^7$ cells per mL. The composition is optionally frozen. In one embodiment, the composition is prepared using the process of the first aspect.

In a third aspect, the invention relates to the use of such a composition as a medicament, e.g., for immunosuppression, for treatment of an autoimmune or other inflammatory disorders, and for treatment of ischemic disorders or other disorders characterized by destruction of tissue. In one embodiment, the composition is used in a method for treating ischemic heart disease, typically administering the composition by direct intra-myocardial injection. Particularly contemplated is allogeneic therapy, i.e., where the donor of the ASCs is not the patient to whom the composition is to be administered.

In a fourth aspect, the invention relates to a substantially homogenous human stem cell population, isolated from adipose tissue collected from a donor, wherein at least about 80% of the ASC population express CD90, CD73, CD13, CD105, CD29, CD166, CD10, CD140b, CD160, CD204, CD272, CD44, CD49a, CD54, CD9, Galectin 3, Galectin 9, HLA-G and LTβR and at most about 15% of the ASC population express CD45, CD19, CD14, CD106, CD31 and CD36. In one embodiment, the stem cell population is prepared using the process of the first aspect.

These and other aspects and embodiments are explained in more detail below.

LEGENDS TO THE FIGURES

FIG. 1 depicts ASC production processes according to some embodiments of the invention.

DETAILED DISCLOSURE OF THE INVENTION

The present invention relates to a stem cell product based on ASCs isolated from healthy donors, typically by two rounds of expanding the ASCs in a bioreactor separated by a cryopreservation step, resulting in a composition suitable for cryopreservation in a cell bank. The product is useful as an allogeneic therapeutic drug, e.g., for regenerative therapy in disorders or diseases characterized by ischemia or other tissue destruction, such as heart disease with and without heart failure, for immunosuppression of autoimmune reactions or transplant rejection, or anti-inflammatory therapy of inflammatory diseases. In particular, the ASC composition can be used as an off-the-shelf cryopreserved product, stored in e.g., liquid nitrogen, and ready for use directly after thawing. The ASC composition can then be administered intravenously, intra-arterially or by direct injection or infusion into a tissue, e.g., myocardium.

Moreover, a cell bank comprising multiple ASC preparations from different donors according to the invention can provide for personalized treatment by, e.g., allowing for tissue matching between donor and recipient prior to treatment, several treatments of the recipient, and, in case the recipient needs several treatments, the possibility to switch ASCs from one donor to another. The latter is particularly useful in case the recipient developed an allo-antibody response to ASCs from an earlier-administered ASC preparation.

Definitions

"ASCs," "Adipose-tissue derived stem cells," "adipose tissue-derived stromal cells" and the like, refer to multipotent stromal stem cells, also known as mesenchymal stem cells, multipotent stromal cells, multipotent stem cells, and mesenchymal stromal/stem cells, which are derived from adipose tissue. Certain criteria for identifying ASCs are known in the art and are described in, for example, Bourin et al. (2013), which is incorporated by reference in its entirety. In some embodiments, ASCs are characterized by their ability to differentiate along adipocytic, chondroblastic and osteoblastic lineages under appropriate conditions. ASCs in culture may be characterized by expression of one or more of the following cell-surface markers: CD90, CD73, CD105 and lack of expression of CD45 and CD31. In some embodiments, they can be distinguished from bone-marrow-derived MSCs by their positivity for CD36 and negativity for CD106.

The stem cell population prepared according to the inventive method described herein is "substantially homogenous", meaning that the majority of the cells comply with ASC standards. Typically, a substantially homogenous ASC population according to the present invention is characterized by at least about 80% of the ASC population expressing CD90, CD105, CD13, CD73, CD166, CD29, and, optionally, CD10, CD140b, CD160, CD204, CD272, CD44, CD49a, CD54, CD9, Galectin 3, Galectin 9, HLA-G and LTβR; and by at most about 15% of the ASC population expressing CD45, CD31, CD14, and CD19. In some ASC populations of the invention, one or more of CD90, CD73, CD13, CD105, CD29, CD166, CD10, CD140b, CD160, CD204, CD272, CD44, CD49a, CD54, CD9, Galectin 3, Galectin 9, HLA-G and LTβR can be expressed by at least about 80%, such as at least about 85%, such as at least about 90%, such as at least about 95%, such as at least about 97% or more of the ASC population. Likewise, in some ASC populations of the invention, one or more of CD45, CD19, CD14, CD106, CD31 and CD36 can be expressed by at most about 15%, such as at most about 12%, such as at most about 10%, such as at most about 7%, such as at most about 5%, such as at most about 3% or less of the ASC population. Specific ranges contemplated for these and other markers are those defined by defined by the minimum and maximum expression percentages of an ASC population as shown in Tables 15 and 20.

By "adipose" is meant any fat tissue. The adipose tissue may be brown or white adipose tissue, derived from the abdominal area or other adipose tissue site. In certain embodiments the adipose is subcutaneous white adipose tissue or visceral adipose tissue or any other tissue containing adipose cells. The adipose tissue may be from any mammal. Preferably, the adipose tissue is human, most preferably from an adult human. A convenient source of adipose tissue is from liposuction surgery.

A "lipoaspirate", as used herein, refers to the material removed during liposuction via an aspirator, i.e., a suction device. The lipoaspirate comprises adipocytes, fat, connective tissue, blood vessels, and a stromal vascular fraction. Any type of liposuction method known in the art can be used, including, but not limited to, suction-assisted, ultrasound-assisted, power-assisted, twin-cannula assisted, laser-assisted and water-assisted liposuction (WAL). WAL is, however, among the preferred options. The "stromal vascular fraction" or "SVF" can then be isolated from the lipoaspirate using methods known in the art, and exemplified below.

As used herein, the term "bioreactor" refers to any device in which biological and/or biochemical processes develop under monitored and controlled environmental and operating conditions, for example, pH, temperature, supply of gas/air and nutrients and waste removal.

The term "cryopreserve" or its various grammatical forms as used herein refers to preserving cells for storage in a cryoprotectant at subzero temperatures. For long-term storage, cryovials containing the cells and cryoprotectant are usually placed in liquid nitrogen.

The term "cryoprotectant" as used herein refers to an agent that minimizes ice crystal formation in a cell or tissue, when the cell or tissue is cooled to subzero temperatures and results in substantially less damage to the cell or tissue after warming in comparison to the effect of cooling without cryoprotectant.

"Viability" as used herein refers to the feature of cells of not taking up membrane impermeant dye (e.g., Trypan Blue, FVS-780, SYTOX blue, propidium iodide), thereby demonstrating cell membrane integrity.

"Proliferative capacity" as used herein refers to the ability of cells to multiply in a suitable cultivation medium. Proliferative capacity can, for example, be represented by the relative number of cells after a 24 h, 48 h or 72 h cultivation period as compared to the number of cells initially plated. This can also be expressed as "population doublings" during a certain period. For example, a population doubling of at least 1 during 48 h in cell culture means that the number of cells seeded have doubled at least once during that period.

As used herein, the term 'donor' refers to the human or mammal from which the adipose tissue is retrieved, typically by liposuction. Preferably, the human is an adult.

The terms "treatment," "therapy" and the like are used herein to generally refer to obtaining a desired pharmacologic and/or physiologic effect. The effect may be prophylactic in terms of completely or partially preventing a disease or symptom thereof and/or may be therapeutic in terms of a partial or complete stabilization or cure for a disease and/or adverse effect attributable to the disease. "Treatment" as used herein covers any treatment of a disease in a mammal, particularly a human or veterinary subject, and includes: (a) preventing the disease or symptom from occurring in a subject which may be predisposed to the disease or symptom but has not yet been diagnosed as having it; (b)

inhibiting the disease symptom, i.e., arresting its development; or (c) relieving the disease symptom, i.e., causing regression of the disease or symptom.

In the context of therapeutic use of the disclosed pharmaceutical compositions, in 'allogeneic' therapy, the donor and the recipient are genetically different individuals of the same species, whereas in 'autologous' therapy, the donor and the recipient is the same individual.

The terms "recipient", "subject" and "patient" are used interchangeably herein and refer to the mammalian subject for whom treatment or therapy is desired, particularly humans.

SPECIFIC EMBODIMENTS OF THE INVENTION

Process:

The process according to the invention offers a safe and effective manufacturing technology based on, e.g., the combination of human platelet lysate as a growth supplement for ASCs, expansion in a closed bioreactor system and final formulation of ASCs as an allogeneic cryopreserved ready-to-use product with high-quality ASCs.

A general overview of the process according to some different embodiments is shown in FIG. 1.

Typically, using the process of the invention, the preparation of a batch of ASC product from an SVF only takes from about 15 to about 18 days, excluding the time in cryostorage. The expansion efficiency is particularly surprising, considering that from one bioreactor SVF run an average yield of 11±5 intermediate product vials can be obtained (mean of 3 SVF runs), each giving rise to an average batch yield of 5±2 ampoules of final product (based on an average of 8 bioreactor ASC runs). Thus an average yield of 55 cryovials with about 110 million ASCs in each may be obtained from about 100 million mononuclear cells (MNCs) in the SVF. Furthermore, as described in the Examples, the ASC product is characterized by a high viability (average 90±2%), as determined immediately after thawing of the second passage ASC product.

In one embodiment, the process for preparing a composition comprising a substantially homogenous adult human stem cell population, comprises the steps of
(i) adding the SVF of a lipoaspirate collected from a donor to a bioreactor wherein at least one surface is pre-treated to promote adhesion of adult human stem cells;
(ii) in the bioreactor, cultivating adherent cells to confluence in a serum-free culture medium supplemented with human platelet lysate;
(iii) detaching the adherent cells;
(iv) freezing the detached cells in a cryoprotectant at a concentration of at least $1\times10^6$ cells/mL;
(v) thawing the frozen cells and repeating steps (ii) to (iii) at least once,
(vi) freezing the detached cells at a concentration of at least $1\times10^7$ cells/mL; and
(vii) optionally, thawing the frozen composition.

In one embodiment, the process for preparing a composition comprising a substantially homogenous adult human stem cell population, comprises the steps of
(i) adding the SVF of a lipoaspirate collected from a donor to a bioreactor wherein at least one surface is pre-treated to promote adhesion of adult human stem cells;
(ii) in the bioreactor, cultivating adherent cells to confluence in a serum-free culture medium supplemented with human platelet lysate;
(iii) detaching the adherent cells;
(iv) repeating steps (ii) and (iii) at least once;
(v) freezing the detached cells at a concentration of at least $1\times10^7$ cells/mL; and, optionally,
(vi) thawing the frozen composition.

In one embodiment, the process for preparing a composition comprising a substantially homogenous adult human stem cell population comprises the steps of
(i) adding the stromal vascular fraction (SVF) of a lipoaspirate collected from a donor to a bioreactor wherein at least one surface is pre-treated to promote adhesion of adult human stem cells;
(ii) cultivating adherent cells of the SVF to confluence in a serum-free culture medium supplemented with human platelet lysate;
(iii) detaching the adherent cells;
(iv) freezing the detached cells in a cryoprotectant at a concentration of at least $1\times10^6$ million cells/mL;
(v) thawing the frozen cells and repeating steps (ii) to (iv), freezing the detached cells at a concentration of at least $1\times10^7$ cells/mL; and, optionally,
(vi) thawing the frozen composition.

The SVF is isolated from a lipoaspirate obtained from a healthy donor, e.g., 50 mL, 100 mL, 200 mL, 300 mL or 500 mL, such as between 100-300 mL, lipoaspirate. Typically, the adipose tissue is first separated from non-adipose tissue using a tissue collection container that utilizes decantation, sedimentation, or centrifugation techniques to separate the materials. The adipose tissue can then disaggregated using methods such as mechanical force (mincing or shear forces), enzymatic digestion with one or more proteolytic enzymes, such as collagenase, trypsin, TrypLe Select, lipase, liberase HI, pepsin, or a combination of mechanical and enzymatic methods. Thereafter, the remaining cells can be retrieved by filtration, centrifugation or the like. Examples of methods to retrieve the SVF from a lipoaspirate are described in Godthardt, et al. (2008) MACS Miltenyi Biotec Information Pamphlet and WO 2014/138383.

In one embodiment, approximately 100 ml lipoaspirate is obtained from a donor by liposuction from the abdomen under local anesthesia. The lipoaspirate is washed twice with phosphate buffered saline (PBS) pH 7.4 to remove residual blood. The adipose tissue is then digested by incubation with collagenase dissolved in a balanced salt solution at 37° C. for 45 min. under constant rotation. The collagenase is neutralised with medium holding 5% human platelet lysate and 1% Penicillin/Streptomycin and is filtered through a 100 μm filter. The remaining cells are centrifuged at 1200×g for 10 min at room temperature, re-suspended and counted using a cell counter according to manufacturer's instructions.

Typically, at least one surface of the bioreactor is pre-treated to facilitate or promote adhesion of ASCs, either by the manufacturer of the bioreactor or at some chosen point of time before initiating the production process. Various types of treatments to promote cell adhesion are known in the art and include, e.g., tissue culture treatment and coating with synthetic charged polymers, nanofibers, glycosaminoglycans and various protein compositions. For tissue culture treatment, a polystyrene-based surface in the bioreactor is modified with plasma gas, resulting in the hydrophobic plastic surface becoming more hydrophilic, the net negative charge promoting cell attachment. As for pre-coating the surface, protein compositions useful for this purpose may comprise one or more plasma proteins such as, e.g., fibrinogen, fibronectin, Factor VIII, von Willebrand factor and Factor XIII; one or more extracellular matrix proteins such as, e.g., collagens and laminins; and/or one or more proteoglycans. In one embodiment, the protein composition comprises or consists of one or both of fibrinogen and fibronectin. In one embodiment, the protein composition comprises or consists of cryoprecipitate. Cryoprecipitate is a well-known blood product prepared from plasma, e.g., where fresh plasma is frozen and thawed and the precipitate collected. The product typically contains fibrinogen and Factor VIII, as well as e.g. von Willebrand factor, Factor XIII and fibronectin. In some embodiments, the cryoprecipitate contains at least 140 mg or more of fibrinogen per 70 IU of Factor VIII, optionally prepared from either AB or low-titer A blood donors. In another embodiment, the protein composition comprises or consists of human platelet lysate, described below.

The basic classes of bioreactors suitable for use with the present invention include hollow-fiber bioreactors and rocking, spinning or rotating perfusion systems, with or without micro-carriers or discs, suitable for anchorage-dependent cell expansion. Preferably, the bioreactor is a functionally closed system or protected by sterile barrier filters, capable of providing for a continuous supply of culture medium and a continuous removal of waste during cell culture. Most preferable are disposable hollow-fiber bioreactors enclosed in an incubator, providing a surface area for cell attachment of at least, 0.5 $m^2$, such as at least 1 $m^2$, such as at least 1.5 $m^2$, such as at least 2 $m^2$, such as between 1 to 3 $m^2$. Preferably, the surface area is at least 2 $m^2$, such as about 2.1 $m^2$. One example of such a bioreactor is the Quantum Cell Expansion System (herein also referred to as "Quantum bioreactor") which is fed through two circulation loops with inlets for media and reagents or cells, waste being removed into a waste bag. As shown in Example 7, expanding the ASCs in a bioreactor significantly increased the expansion rate and yield relative to manual processing in standard tissue culture flasks.

Prior to loading of the SVF (or first passage ASCs) into the bioreactors, the system can be primed with a buffer, e.g., phosphate buffered saline, and subsequently loaded with a protein or other composition for coating. Before loading the cells, the buffer can then be washed out of the system and replaced with complete medium.

The cells can then be added to the bioreactor. For example, approximately 10, 20, 50, 100, 200 or 500 million mononuclear cells (MNCs) from the SVF preparation or approximately 5, 10, 20, 50 or 100 million first-passage ASCs can be loaded into the primed and coated bioreactor through the inlet, optionally via a filter. Preferably, for MNCs, about 100 million cells from the SVF are loaded. For the second passage, preferably, about 5 to 50 million cells from the first-passage ASCs are loaded, such as between 5 and 30, 5 and 25, 10 and 30 or between 15 and 25 million cells. For any higher passage of the cells (i.e., $3^{rd}$ passage, $4^{th}$ passage etc.), cells can be added in amounts similar to the second passage. The cells are then allowed to attach for a sufficient period of time, such as for at least 5 h and/or up to about 24 h, after which continuous feeding with media is activated. For example, the media feeding rate may start at about 0.1 mL/min, and then adjusted based on glucose and/or lactate measurements and/or cell expansion.

Any standard cell culture medium can be used, such as, e.g., Dulbecco's Modified Eagle's Medium (DMEM), alpha-Minimum Essential Medium (α-MEM). As shown in Example 6, however, the use of a human plasma lysate (HLP) product was clearly a more effective growth supplement in terms of proliferative capacity than the use of FBS, without compromising genomic stability. HPL is typically a turbid, light-yellow liquid that is obtained from human blood platelets after one, two, three or more freeze/thaw cycles. These cycles cause the platelets to lyse, releasing their intracellular contents, including growth factors and the like, into the surrounding medium. Some HPL preparations include blood clotting factors, in which case it may be advantageous to add an anti-coagulant such as heparin to prevent coagulation. Other HPL preparations can be processed to remove, or otherwise inhibit the effect of, the clotting factors. HPL preparations, some of which GMP grade, are available commercially from, e.g., Compass Biomedical, Inc., Cook General Biotechnologyl, Macopharma SA, Cook Regentech, Mill Creek, iBiologics and Trinova Biochem GmbH under the product lines PLUS, Stemulate, Human Platelet Lysate, PLTMax, XcytePlus and CRUX RUFA Media Supplements. Preferably, the culture medium for the ASCs comprise from about 1% to about 20%, such as from about 2% to about 15%, such as from about 3% to about 12%, such as from about 5% to about 10%, such as about 5%, 8% or 10% HPL. Preferably, the culture medium comprises from about 2% to about 15% HPL in, e.g., MEM. A preferred HPL preparation is Stemulate, which does not require the addition of heparin (WO 2015031465 A1).

Once cell growth has reached or nearly reached its stationary phase, as determined by, e.g., stagnation in glucose consumption and/or lactate production, the ASCs are harvested, typically by loading TrypLe Select into the system. Harvested cells can then be washed and transferred into centrifuge tubes, pelleted and counted.

First-passage ("intermediate") ASCs can then be cryopreserved or, alternatively, directly loaded into the pre-coated bioreactor for a second (or $3^{rd}$, $4^{th}$ etc.) round of expansion. For cryopreservation, the intermediate ASCs are suspended in cryoprotectant at a concentration of at least about $1 \times 10^6$ cells per mL, such as at least about $2 \times 10^6$ cells per mL, at least about $5 \times 10^6$ cells per mL, at least about $10 \times 10^6$ cells per mL, at least about $15 \times 10^6$ cells per mL, at least about $20 \times 10^6$ cells per mL, or at least about $50 \times 10^6$ cells per mL, such as between $1 \times 10^6$ and $50 \times 10^6$ cells per mL, such as between $1 \times 10^6$ cells and $20 \times 10^6$ cells per mL.

Second (or higher, such as $3^{rd}$, $4^{th}$ etc.) passage ASCs can be cryopreserved. For cryopreservation, the second (or higher) passage ASCs are suspended in cryoprotectant at a concentration of at least about $1 \times 10^7$ cells per mL, such as at least about $1.5 \times 10'$ cells per mL, at least about $2 \times 10^7$ cells per mL, at least about $2.5 \times 10^7$ cells per mL, at least about $3 \times 10^7$ cells per mL, at least about $5 \times 10^7$ cells per mL, or at least about $10 \times 10^7$ cells per mL, such as between $1 \times 10^7$ and $5 \times 10^7$ cells per mL, such as between $2 \times 10^7$ cells and $3 \times 10^7$ cells per mL. In one embodiment, the second (or higher, such as $3^{rd}$, $4^{th}$ etc.) passage ASCs are suspended in cryoprotectant at a concentration of about $2 \times 10^7$ cells per mL cryoprotectant, such as about $2.2 \times 10^7$ cells per mL cryoprotectant. As used herein, unless contradicted by context, $2 \times 10^7$ cells per mL includes or corresponds to from $1.6 \times 10^7$ to $2.4 \times 10^7$ cells per mL and about $2.2 \times 10^7$ cells per mL includes or corresponds to from 2.0 to 2.4 cells per mL.

The cryoprotectant is preferably protein-free, endotoxin-free and sterile. While several suitable cryoprotectants are available, non-limiting examples of cryoprotectants contemplated for the ASC compositions of the present invention are CryoStor® (BioLife Solutions), including CryoStor CS2, CryoStor CS5 and CryoStor CS10; and ProFreeze (Lonza). CryoStor freeze media are sterile serum-free, protein-free and animal component free, having a pH 7.5-7.7, and an endotoxin level under 1 EU/mL. In one embodiment, the cryoprotectant is Hypothermosol® (CMS, Rockville, Md.) plus 10% DMSO (WO 2000/002572 A1). Hypothermosol® comprises Trolox (6-hydroxy-2,5,7,8-tetramethylchroman-2-carboxylic acid), $Na^+$, $K^+$, $Ca^{2+}$, $Mg^{2+1}Cl^-$, $H_2PO_4^-$, HEPES, lactobionate, sucrose, mannitol, glucose, Dextran-40 (i.e., dextran with an average MW of 40,000 Da), adenosine and glutathione (WO 2010/064054 A1). According to the manufacturer, ProFreeze should be supplemented with 10% DMSO at time of use. WO 2000/002572 A1 and WO 2010/064054 A1 are hereby incorporated by reference in their entireties.

In any embodiment herein where DMSO is used, the DMSO can be replaced by a glucan such as, for examples dextran, having an average molecular weight in the range of 35000 to 45000 Da, such as, e.g., Dextran-40.

In one embodiment, the cryoprotectant comprises between 5% and 15% DMSO, such as about 5%, about 6%, about 8%, about 10%, about 12% or about 15% DMSO, and Trolox, $Na^+$, $K^+$, $Ca^{2+}$, $Mg^{2+1}Cl^-$, $H_2PO_4^-$, HEPES, lactobionate, sucrose, mannitol, glucose, Dextran-40, adenosine and glutathione. Preferably, the cryoprotectant comprises about 10% DMSO.

In one embodiment, the cryoprotectant comprises a 1:10 to about 1:20 mixture of DMSO and an aqueous solution comprising
(a) one or more electrolytes selected from the group consisting of potassium ions at a concentration ranging from about 35-45 mM, sodium ions ranging from about 80-120 mM, magnesium ions ranging from about 2-10 mM, and calcium ions ranging from about 0.01-0.1 mM;
(b) a macromolecular oncotic agent having a size sufficiently large to limit escape from the circulation system and effective to maintain oncotic pressure equivalent to that of blood plasma and selected from the group consisting of human serum albumin, polysaccharide and colloidal starch;
(c) a biological pH buffer effective under physiological and hypothermic conditions; (d) a nutritive effective amount of at least one simple sugar;
(e) an impermeant and hydroxyl radical scavenging effective amount of mannitol;
(f) an impermeant anion impermeable to cell membranes and effective to counteract cell swelling during cold exposure, said impermeant ion being at least one member selected from the group consisting of lactobionate, gluconate, citrate and glycerophosphate;
(g) a substrate effective for the regeneration of ATP, said substrate being at least one member selected from the group consisting of adenosine, fructose, ribose and adenine; and
(h) glutathione.

In one embodiment, the cryoprotectant comprises a 1:10 to about 1:20 mixture of DMSO and an aqueous solution comprising
a). one or more electrolytes selected from the group consisting of potassium ions at a concentration ranging from 35-45 mM, sodium ions ranging from 80-120 mM, magnesium ions ranging from 2-10 mM, and calcium ions ranging from 0.01-0.1 mM;
b). a macromolecular oncotic agent having a size sufficiently large to limit escape from the circulation system and effective to maintain oncotic pressure equivalent to that of blood plasma and selected from the group consisting of human serum albumin, polysaccharide and colloidal starch;
c). a biological pH buffer effective under physiological and hypothermic conditions;
d). a nutritive effective amount of at least one simple sugar;
e). an impermeant and hydroxyl radical scavenging effective amount of mannitol;
f). an impermeant anion impermeable to cell membranes and effective to counteract cell swelling during cold exposure, said impermeant ion being at least one member selected from the group consisting of lactobionate, gluconate, citrate and glycerophosphate;
g). a substrate effective for the regeneration of ATP, said substrate being at least one member selected from the group consisting of adenosine, fructose, ribose and adenine, and
h). at least one agent which regulates apoptotic induced cell death.

The suspension of first, second (or higher) passage ASCs in cryoprotectant is then added to cryovials. For first-passage (intermediate) ASCs, each cryovial may contain about 1, about 2, about 3, about 4, about 5, about 6, about 7, about 8, about 9, about 10, about 15, or about 20 mL ASC suspension, corresponding to a number of ASCs in the range of 5 million cells to 250 million cells, such as, e.g., about 20, about 30, about 40, about 50, about 60, about 80 or about 100 million cells. Preferably, cryovials with first-passage ASCs contain about 50 million cells in 5 mL.

For the final passage ASCs, i.e., the $2^{nd}$ or higher passage ASCs, each cryovial may contain about 1, about 2, about 3, about 4, about 5, about 6, about 7, about 8, about 9, about 10, about 15, or about 20 mL ASC suspension, corresponding to a number of ASCs in the range of 10 million cells to 500 million cells, such as, e.g., about 40, about 60, about 80, about 100, about 110, about 120, about 160 or about 200 million cells. Preferably, cryovials with second-passage ASCs contain from about 100 million to about 120 million cells in about 5 mL, such as about 110 million cells in about 5 mL. In the compositions of the invention, unless contradicted by context, about 110 million cells includes from 100 million to 120 million cells.

Freezing can advantageously be performed by automated freezing with the use of a controlled rate freezer. After freezing vials can be transferred and stored at a temperature in the range of −70° C. to −196° C., such as between −150° C. to −190° C., such as in the −180° C.-range. Various means for freezing and maintaining vials under such freezing conditions are known, many of which involving liquid nitrogen. They include, for example, immersion of the vials in liquid nitrogen, storing the vials in the vapour phase of liquid nitrogen, and placing the vials in so-called dry storage. In the later type of storage, the vials are not in direct contact with liquid or vapour phase nitrogen since the nitrogen is contained in the shell of the container, resulting in a storage temperature in the −180° C.-range.

In one aspect, a two-tiered cell banking system is established for the vials, constituting a working cell bank holding intermediate ASCs from first passage bioreactor expansions and a product cell bank holding finally formulated and packaged ASC compositions. In the cell bank, the first passage intermediate ASCs are typically cryopreserved at about 50 million cells in about 5 ml CryoStor10 in cryovials until loading for second bioreactor expansion. The final ASC product is typically cryopreserved at about 110 million cells in about 5 ml CryoStor10 in cryovials until right before use. This product can also be designated "CSCC_ASC". In one embodiment, the cell bank comprises a plurality of vials stored under freezing conditions, each vial comprising about 5 mL of the second-passage ASCs, wherein the cell concentration is $2 \times 10^7$ cells per mL, e.g., in the range of $1.6 \times 10^7$ to $2.4 \times 10^7$ cells per mL, or about $2.2 \times 10^7$ cells per mL, e.g., in the range of $2.0 \times 10^7$ to $2.4 \times 10^7$ cells per mL.

ASCs:

The ASCs of the invention are characterized by their multipotent capacity, marker profile, and/or and by functional characteristics of the ASCs, such as proliferation capacity, viability, recovery and immunosuppressive capability, even after cryopreservation. These ASC characteristics, detailed below, each applies equally to the ASCs obtained according to the process of the invention. Marker profiles can, for example, be conveniently determined by flow cytometry using fluorescence-labelled antibodies against each marker, e.g., as described in Example 2, 10, 11 or 14.

The ASCs are, in particular, characterized by their ability to differentiate along adipocytic, chondroblastic and osteoblastic lineages under appropriate conditions. As shown in Example 4, ASCs prepared according to the manufacturing methods described in Example 1 differentiated into adipocytes, chondrocytes and osteoblasts when cultured in differentiation medium.

The ASCs can also or alternatively be characterized according to their phenotype, i.e., marker profile, regarding their expression of markers in common with other mesenchymal stromal/stem cells, including CD90, CD73, CD105, and CD44, and maintaining low or negligible expression levels of CD45 and CD31 (Bourin et al., 2013).

In some embodiments, a substantially homogenous ASC population is one wherein at least 80%, such as at least 85%, such as at least 90%, such as at least 95%, such as at least 98% of the stem cell population express CD105, CD90, CD73, CD29 and CD13, and at most 10%, such as at most 5%, such as at most 3%, such as at most 2% express CD45, CD34, HLA-DR, CD19 and CD14. Preferably, at least 95% express CD90, CD73 and CD13 and at most 5% express CD45, CD34, HLA-DR, CD19 and CD14.

In some embodiments, a substantially homogenous ASC population is one wherein at least 90% express CD90, CD73, CD13, CD29 and CD166; at most 5% express CD45, CD19, CD14 and CD31; at most 10% express CD106; between 2 and 15% express CD36; at least 10% express CD146; at least 80% express CD105 and at most 40% express CD34. In some embodiments, at least 95% express CD90, CD73, CD13, CD29 and CD166. In addition, at least 80%, such as at least 85%, such as at least 90%, such as at least 95%, such as at least 98% may express CD44.

In some embodiments, a substantially homogenous ASC population is one wherein at least about 80%, such as at least about 85% express CD105, CD90, CD73, CD13, CD29 and CD166, such as at least about 90%, such as at least about 95% express CD90, CD73, CD13, CD29 and CD166; at most about 15%, such as at most about 10% express CD45, CD19, CD14, CD106, CD31 and CD36, such as at most about 7%, such as at most about 5%, such as at most about 3% express CD45, CD19, CD14, CD106 and CD31; at least about 2%, such as at least about 5%, such as between about 1% and about 20%, such as between about 2% and about 15% or between about 5% and about 15% express CD36; at most about 50%, such as at most about 40%, such as at most about 20%, such as at most about 10% express CD34; and at least about 10%, such as at last about 12% express CD146. In one embodiment, at least 95% express CD90, CD73, CD13, CD29 and CD166; at least 85% express CD105, at most 2% express CD45, HLA-DR, CD19, CD14 and CD31; between 2% and 15% express CD36; and between 10% and 60% express CD146. In one embodiment, a substantially homogenous ASC population is one wherein the ranges of the minimum and maximum expression percentages of markers are those shown in Table 20.

When determined immediately after thawing of the cryopreserved $2^{nd}$ passage cells, at least about 80%, such as at least 85%, such as at least 90%, such as at least 95%, such as at least 98% of the cells are viable, as determined by dye exclusion (see, e.g., Example 3). Preferably, at least 90% of the cells are viable.

As for proliferation capacity, when placed in culture immediately after thawing, the ASCs are characterized by a population doubling (PD) of at least 1, such as at least 1.3, such as at least 1.5, such as at least 1.7, such as at least 2, when cultured in tissue culture flasks for 48 h (e.g., according to the method in Example 3). Preferably, the ASCs have a PD of at least 1, such as at least 1.5. PD is calculated as Ln (N)/Ln 2, where N=Cell harvested/Cell seeded.

As shown in the Examples, the ASCs of the invention are further characterized by their immunosuppressive properties. For example, the ASCs may be characterized by one or more or all of the following: suppressing activation of dendritic cells (DCs), suppressing proliferation of peripheral blood mononuclear cells (PBMCs), cell surface markers indicative of immunomodulation, especially immunosuppression, or by a change in one or more cell surface markers in response to a cytokine such as interferon-gamma.

In one embodiment, the ASCs of the invention suppress activation of DCs, e.g., reducing the expression of CD40, CD80, CD86 and HLA-DR by DCs mixed with ASCs as compared to DCs not mixed with ASCs (i.e., a positive control). In a specific embodiment, the assay of Example 9 is used, wherein ASCs and DCs are seeded to result in approximately a 1:1 ratio; the DCs being stimulated with 1 µg/mL lipopolysaccharide (LPS) and 20 ng/mL interferon-gamma and incubated for 24 h; and the respective expression level of CD40, CD80, CD86 and HLA-DR is reduced, in average, to at most 80%, 65%, 70% and 80%, respectively, of the positive control.

In one embodiment, the ASCs of the invention suppress the proliferation of PBMCs, e.g., as determined in a Mixed Lymphocyte Reaction (MLR). This type of assay is well-known in the art, and may comprise mixing ASCs with stimulated PBMCs from an allogeneic donor in different ratios, e.g., in the range 1:20 to 1:1, using PBMCs without ASCs as positive controls, and measuring after a 4-day co-culture period, the PBMC incorporation of 3H-thymidine (25 pSi/ml) during an 18-20 h incubation period. Using this type of assay, as compared to the positive control, a 1:20, 1:10, 1:5 and 1:1 ratio of ASCs to PBMCs may result in an average 3H-thymidine incorporation of at most about 80%, 75%, 55%, and 25%, respectively, of the positive control.

In some embodiments, the ASCs are also or alternatively characterized by specific markers indicative of immunomodulation, especially immunosuppression, such as CD10, CD140a, CD160, CD204, CD258, CD270, CD272, CD44, CD49a, CD54, CD9, Galectin 3, Galectin 9, HLA-G, LTβR and combinations thereof. Without being limited to theory, these markers are associated with immune signalling, cell-cell and cell-ECM adhesion, homing, pattern recognition, T cell inhibition, up-regulation of growth factor receptors and inactivation of pro-inflammatory proteins.

In particular, in one embodiment, a substantially homogenous ASC population is one wherein at least about 80%, such as at least about 85%, express CD10, CD140b, CD160, CD204, CD272, CD44, CD49a, CD54, CD9, Galectin 3, Galectin 9, HLA-G and/or LTβR, and, optionally, HLA-ABC, such as at least about 90% or in some cases at least about 95% or more express CD10, CD140b, CD160, CD204, CD272, CD44, CD54, CD9, Galectin 3, Galectin 9, HLA-G and LTβR. In some embodiments, the ASCs may further be characterized by expressing no more than about 20%, such as no more than about 15%, or in some cases no more than about 10%, of CD152, CD274 and/or CD86; and/or optionally, at least about 70% CD258, at least about 55% CD270, at least about 80% CD49a, up to about 30% CXCR4 and/or between about 5% to about 35% CD200. In some embodiments, the ASC population may also be one wherein at most about 15% of the ASCs express CD15, CD152, CD163, CD18, CD274, CD39, CD40, CD62L, CD80, CD86, and, optionally HLA-DR, -DQ, -DP.

In one embodiment, a substantially homogenous ASC population is one wherein at least 90% express CD10, CD140b, CD160, CD204, CD272, CD44, CD54, CD9, Galectin 3, Galectin 9, HLA-G and LTβR; at least 80% express CD49a; at least 60% express CD258 and CD270 and at least 5% express CD200; at most 15% express CD15, CD152, CD163, CD18, CD274, CD39, CD40, CD62L, CD80 and CD86; and at most 30% express CXCR4.

In one embodiment, a substantially homogenous ASC population is one wherein at least 95% of the ASC population express CD10, CD140b, CD160, CD204, CD272, CD44, CD54, CD9, Galectin 3, Galectin 9, HLA-G and LTβR; at least 85% express CD49a, at least 65% express CD258 and CD270 and at least 10% of the population express CD200, and at most 15% of the population express CD15, CD152, CD163, CD18, CD274, CD39, CD40, CD62L, CD80, CD86, and HLA-DR, -DQ, and -DP, and at most 25% express CXCR4.

In one embodiment, the ASCs are further characterized by less than 20%, such as less than about 15%, such as less than about 10% of the ASCs expressing CD274. Optionally, the ASCs are also characterized by at least about 90%, such as at least about 95%, such as at least about 98% of the ASCs expressing CD54. In another specific embodiment, the ASCs are characterized by each marker in Table 15 in Example 10 at a percentage of population in the range from the minimum to the maximum value shown in Table 15.

The ASCs may also be characterized by their expression percentages of stromal/stem cell markers according to one embodiment herein and their expression percentages of immunomodulation markers according to one embodiment herein. As a non-limiting example, a substantially homogenous ASC population is one wherein
 at least 90% express CD90, CD73, CD13, CD29 and CD166; at most 5% express CD45, CD19, CD14 and CD31; at most 10% express CD106; between 2 and 15% express CD36; at least 10% express CD146; at least 80% express CD105 and at most 40% express CD34; and
 at least 90% express CD10, CD140b, CD160, CD204, CD272, CD44, CD54, CD9, Galectin 3, Galectin 9, HLA-G and LTβR; at least 80% express CD49a; at least 60% express CD258 and CD270 and at least 5% express CD200; at most 15% express CD15, CD152, CD163, CD18, CD274, CD39, CD40, CD62L, CD80 and CD86; and at most 30% express CXCR4.

In a further embodiment, the ASCs of the invention are also or alternatively characterized by a change in one or more cell surface markers in response to a pro-inflammatory cytokine such as interferon-gamma. This may advantageously be tested according to the assay of Example 11, typically measuring a change in one or more ASC markers in Table 16 and 17 showing a positive or negative change in the percentage of the ASC population expressing the marker in at least 5% of the ASC population, or
 a positive- or negative change in the expression level of the marker on the portion of cells expressing the marker of at least 0.5-fold,
when cultivated for 3 days in the presence of 50 ng/ml IFN-gamma, as compared to a control, such as cells from the same ASCs which have not been stimulated with IFN-gamma.

For example, in some embodiments, upon INF-gamma stimulation, the percentages of the ASC population expressing CD200, CD270, CD9, CXCR4 are reduced; the percentages of the ASC population expressing CD274 and CD49a are increased, and the expression level of CD54 on CD54-positive cells is increased.

In some embodiments, the change is one or more or all of
 the percentage of the ASC population expressing CD274, CD106 and/or CD49a being increased by at least 5%, such as the percentage of CD274 being increased by at least 40%, such as at least 60%;
 the percentage of the ASC population expressing CD200, CD270, CD9 and/or CXCR4 being reduced by at least 5%, such as the percentage of the ASC population expressing being reduced by at least 10%;
 the expression level of CD10, CD54, HLA-ABC and/or HLA-DR/DQ/DP increasing on marker-positive cells, such as the expression level of CD54 on CD54-expressing cells increasing by at least 20-fold, such as at least 35-fold, such as at least 30-fold; and/or
 the expression level of LTβR decreasing, e.g., by at least _2-fold.

In a specific embodiment, at most about 30%, such as at most about 20%, such as at most about 15%, such as at most about 10% of the ASC population expresses CD274 whereas upon interferon-gamma stimulation, at least 70%, such as at least about 80%, such as at least about 85%, such as at least about 90%, such as at least about 95% of the ASC population expresses CD274, e.g., when cultivating the ASCs for 3 days in the absence and presence of 50 ng/ml IFN-gamma, respectively.

Also of note is an increase in MFI from 3 to 97 for the marker CD54 (ICAM-1) which illustrates the mobilisation of an intercellular adhesion molecule necessary for the stabilisation of ASC-leukocyte interactions and signal transduction. ICAM-1 is a ligand for LFA-1 (integrin), a receptor found on leukocytes. So, in one embodiment, at least 95% of the ASC population expresses CD54 and upon interferon-gamma stimulation, the expression level of CD54 on CD54-expressing cells is increased by at least 20-fold, such as at least 30-fold.

In a particular embodiment, upon interferon-gamma stimulation, the percentage of the ASC population expressing CD274 is increased to at least 80% and the expression level of CD54 on CD54-positive cells is increased at least 25-fold.

Compositions:

Also provided by the present invention are compositions of each ASC population detailed in the aspects and embodiments herein, including those in the preceding "ASCs" section and those obtained by each process in the "Process" section. Each such ASC population is also provided in the format of a composition of the invention.

In particular, it has been found that ASCs, particularly ASCs obtained according to the process of the invention, can be cryopreserved at high concentrations in protein-free cryoprotectant; at least about $1 \times 10^7$ cells per mL, without compromising viability, proliferation capacity, immunosuppressive properties, or recovery. It has also been found that CryoStor-based cryoprotectant may provide for a higher proliferation capacity than a human serum albumin (HSA)-based cryoprotectant.

In particular, the compositions of the invention may comprise a suspension of a substantially homogenous adult human stem cell population, isolated from adipose tissue collected from a donor, in a protein-free cryoprotectant, wherein the cell concentration is at least $1 \times 10^7$ cells, such as at least $1.5 \times 10^7$ cells, such as at least $2 \times 10^7$ cells, such as at least $3 \times 10'$ cells, such as at least $5 \times 10^7$ cells, per mL added cryoprotectant. Preferably, the cell concentration is at least $2 \times 10^7$ cells, such as about $2.2 \times 10^7$ cells per mL added cryoprotectant.

As described above, the protein-free cryoprotectant typically comprises from about 5% to about 15% DMSO and Trolox, $Na^+$, $K^+$, $Ca^{2+}$, $Mg^{2+1}Cl^-$, $H^2PO_4^-$, HEPES, lactobionate, sucrose, mannitol, glucose, dextran-40, adenosine and glutathione. Preferably, the cryoprotectant comprises about 10% DMSO. Other protein-free cryoprotectants known in the art may also be used. Those already described in the "Process" section are particularly contemplated.

Also provided are the compositions obtained when thawing the frozen ASC compositions. The frozen ASC compositions may, for example, be thawed in a 37° C. water bath or thawed/stored in room temperature in the operation room. Preferred are compositions where, immediately after thawing
   (a) at least 85% of the ASC population are viable cells, and the viability after storage in room temperature for 2 hours is at least 80%;
   (b) the ASC population has a proliferation capacity providing for a PD of at least 1 when cultured for 48 hours;
   (c) the ASC population is capable of suppressing dendritic cell maturation and activation;
   (d) the recovery after thawing is over 95%, and the recovery of cells after storage at room temperature for 2 h after thawing is at least 85%
   (e) the ASC population has an in vitro cell adherence such that at least 60%, such as at least 65%, such as at least 70% of the total number of cells are adherent after 5 h in cultivation.

Also preferred are compositions, where, after storage at room temperature for 2 h after thawing,
   (a) at least 80% of the stem cell population are viable cells;
   (b) the stem cell population has a PD of at least 1 when cultured for 48 hours;
   (c) the stem cell population is capable of suppressing dendritic cell maturation and activation;
   (d) the recovery is at least 85%, and
   (e) the ASC population has an in vitro cell adherence such that at least 60%, such as at least 70% of the total number of cells are adherent after 5 h in cultivation.

Also provided by the present invention are pharmaceutical compositions. The compositions of the invention are sterile and free of endotoxins and mycoplasms, endotoxin levels typically determined with an analytical method providing for a minimum detection level of 10 IE per ml. Since the compositions of the invention are ready for clinical use, the pharmaceutical compositions typically only comprise the ASCs and the protein-free cryoprotectant. However, additional components are also contemplated. Specifically, the pharmaceutical composition may further comprise a soluble biomaterial or hydrogel containing natural or synthetic biopolymers such as extracellular matrix proteins, -peptides or -glycosaminoglycans and/or alginate. For example, the pharmaceutical composition may comprise sterile and endotoxin free Alginate (Sodium alginate VLVG, Novamatrix, FMC Biopolymers, Norway), partially calcium cross-linked with D-gluconic acid and hemicalcium salt (Follin et al., 2015). In one embodiment, the alginate is mixed with ASCs and cryoprotectant to a final concentration of 1% (w/v) partially cross-linked alginate before the final cryopreservation step. In another embodiment partially cross-linked alginate is stored at RT and mixed with the final product to a final concentration of 1% (w/v) alginate, e.g., by injecting the ASC preparation into the alginate container before the final suspension is aspirated and connected with the injection catheter.

Also provided are syringes or other means for injection or infusion of the ASC compositions, which contain the ASC compositions. Typically, the ampoule holding the ASC composition is sterilised with an alcohol swab (82% Ethanol and 0.5% Chlorhexidin, Mediq, Denmark) and the cell suspension aspirated with a needle into a sterile syringe. The syringe is then connected to an injection catheter, e.g., a MYOSTAR injection catheter (Biological Delivery System, Cordis, Johnson & Johnson, USA) for injection. Injection is recommended within 3 hours of thawing. Preferably, the syringe or other means for injection or infusion contain about 5 mL of the composition, comprising from about 100 million to about 120 million cells, such as about 110 million ASCs.

Therapeutic Use:

In one embodiment, there is provided an ASC composition for use as a medicament, e.g., for tissue regeneration, immunosuppression and/or as an anti-inflammatory drug.

Indeed, the invention provides for various therapeutic uses of the ASCs and ASC compositions of the invention, which are "off-the-shelf" and ready for clinical use. Because of their high concentration of ASCs, typically at least $1 \times 10^7$ cells, preferably at least $2 \times 10^7$ cells, such as about $2.2 \times 10^7$ cells, per mL cryoprotectant, the compositions can be used for applications where a small injection volume is essential as well as for applications where the high-concentration compositions are diluted before administration and administered, e.g., by infusion. Moreover, the ASCs from several different donors can be stored in a cell bank, allowing for repeated and/or more versatile treatment options.

Without being limited to theory, after administration, the ASCs stimulate and improve regeneration through paracrine mechanisms releasing extracellular substances promoting natural endogenous repair mechanisms including matrix remodelling, revascularisation and immune modulation. Another inherent part of ASC immune modulation is active immunosuppression preventing immunogenicity and thereby rejection of the allogeneic ASC graft. This may be an inborn ASC characteristic distinguishing these cells from other somatic cells.

So, in one embodiment, there is provided an allogenic therapeutic product for use in tissue regeneration, e.g., in treating or preventing an ischemic tissue disorder or other tissue dysfunction or destruction disorder. Non-limiting examples of ischemic tissue disorders include ischemic heart disease (with and without heart failure), acute myocardial infarction, ischemic cerebral stroke, critical limb ischemia, ischemic wound and ischemic reperfusion-injury/primary organ graft dysfunction. Non-limiting examples of tissue dysfunction or destruction disorders include intervertebral disc repair, non-ischemic dilated cardiomyopathy and joint cartilage disorders. In some embodiments, from about $5 \times 10^7$ to about $5 \times 10^8$ cells in at most about 5 mL of a composition according to the invention are administered directly to the ischemic tissue. In a specific embodiment, from about $5 \times 10^7$ to about $5 \times 10^8$ cells in at most about 5 mL of a composition according to the invention are administered by intra-myocardial injection to a patient with reduced left ventricular ejection fraction (EF) and heart failure. For example, a CSCC_ASC product comprising about 110 million cells in 5 mL cryoprotectant can be thawed and administered within at most 1, at most 2 or at most 3 hours by direct intra-myocardial injection in a patient with reduced left ventricular EF and heart failure. In another specific embodiment, from about $5 \times 10^7$ to about $5 \times 10^8$ cells in at most about 1 to about 5 mL of a composition according to the invention are administered by direct injection into a joint of a patient, e.g., suffering from joint cartilage disorder.

In one embodiment, there is provided an allogenic therapeutic product for use as an immunosuppressant, e.g., for treating or preventing an autoimmune disease or disorder or transplant rejection. Non-limiting examples of autoimmune diseases and disorders include Crohn's disease, multiple sclerosis, type 1 diabetes, kidney disease, rheumatic arthritis and rejection of a transplanted organ, including but not limited to bone marrow, heart, lung and kidney transplants. In a specific embodiment, from about $10 \times 10^6$ to about $0.5 \times 10^6$ cells per mL in about 200 ml sterile infusion liquid of a composition according to the invention can be administered by intravenous or intra-arterial injection or by infusion to a patient, e.g., a patient suffering from Crohn's disease.

In one embodiment, there is provided an allogenic therapeutic product for use in treating or preventing inflammation, i.e., as an anti-inflammatory drug. Non-limiting examples of inflammatory disorders include type 2 diabetes, kidney disease, non-ischemic dilated cardiomyopathy, pulmonal arterial hypertension and sepsis. In a specific embodiment, from about $10 \times 10^6$ to about $0.5 \times 10^6$ cells per mL in about 200 ml sterile infusion liquid of a composition according to the invention can be administered by intravenous or intra-arterial injection or by infusion to a patient, e.g., a patient suffering from pulmonal arterial hypertension.

For example, a CSCC_ASC product can be thawed, optionally diluted in 5 to about 200 ml sterile infusion liquid to a concentration from about $10 \times 10^6$ to about $0.5 \times 10^6$ cells per mL, e.g., 1, 2, 3, 4, 5, 6, 7, 8, 9 or 10 million cells per mL; and administered within at most 1, at most 2 or at most 3 hours by injection or infusion in a patient suffering from or at risk for an autoimmune or inflammatory disorder or transplant rejection. Alternatively, a CSCC_ASC product can be thawed and diluted in sterile liquid to a concentration of about 12, 13, 14, 15, 16, 17, 18, 19 or 20 million cells per mL, and administered by intravenous or intra-arterial injection or infusion, or administered directly into a diseased tissue.

In some embodiments, multiple ASC preparations according to the invention can provide for personalized treatment by, e.g., allowing for tissue matching between donor and recipient prior to treatment, several treatments of the recipient, and, in case the recipient needs several treatments, the possibility to switch ASCs from one donor to another. The latter is particularly useful in case the recipient has developed an allo-antibody response to ASCs from an earlier-administered ASC preparation, in which case it may not be possible to continue using ASCs from the same donor. Specifically, a cell bank with ASCs from multiple donors permits recipient-donor tissue matching, which may improve clinical efficacy.

The present invention is illustrated by the following Examples, which are not intended to be limiting.

Example 1

Manufacture of ASC Product
The following procedure has been used:
Isolation of Stromal Vascular Fraction:
Lipoaspirate is obtained from healthy donors. Donor eligibility is determined based on a donor interview, a questionnaire and testing for infectious disease markers HIV, hepatitis B and C, syphilis and HTLV. Liposuction of subcutaneous abdominal fat is performed under local anesthesia and provides approximately 100 ml to 300 mL lipoaspirate from each donor. Local anesthesia is placed in the abdominal skin, 2-4 places for subsequent liposuction plug in. Through these holes the infusion cannula (thin needle) is introduced while injecting liquid holding, e.g., anaesthetics and reagents to loosen up fat tissue, such as lactated buffer, sodium bicarbonate, adrenalin and lidocaine. Bodyjet EVO (water assisted liposuction) (Human med, Germany) is used. Lipoaspirate is removed through the Bodyjet suction cannula and into the sterile collection chamber. Lipoaspirate is transferred into a sterile flask/bottle with a sterile syringe.

Stromal vascular fraction is isolated from lipoaspirate by enzymatic digestion of adipose tissue prior to culture expansion in bioreactors. The lipoaspirate is washed twice with phosphate buffered saline (PBS) pH 7.4 to remove residual blood. The adipose tissue is digested by incubation with 0.6 PZ U/ml collagenase NB6 (Serva GmbH, Germany) dissolved in HBSS ($+CaCl^2+MgCl^2$) (Gibco, Life Technologies) diluted to a concentration of 2 mM $Ca^{2+}$ at 37° C. for 45 minutes under constant rotation. The collagenase is neutralised with medium holding 5% human platelet lysate and 1% Penicillin/Streptomycin and is filtered through a 100 μm filter (Steriflip, Millipore). The remaining cells are centrifuged at 1200 g for 10 min. at room temperature, re-suspended and counted using a NucleoCounter® NC-100™ according to manufacturer's instructions.
First Passage Expansion:

Approximately 100 million SVF cells are loaded into a bioreactor (Quantum Cell Expansion System, Terumo, Belgium) for expansion of ASCs. The Quantum bioreactor is a functionally closed system consisting of a disposable hollow-fiber bioreactor enclosed in a stand-alone incubator. It is fed through two circulation loops with inlets for media and reagents or cells. Waste is removed into a waste bag.

The entire process is computerised and controlled by a touch screen interface, allowing control of medium perfusion rate, harvest time, media washouts and other tasks associated with the growth of ASCs. With the exception of filling inlet bags with cryoprecipitate; adding enzymes for detachment of cells; or transferring harvested cells from the harvest bag to the cell inlet bag (all of which are done prior to loading onto the Bioreactor), all procedures associated with the bioreactor are closed or protected by a 0.2-mm sterile barrier filter.

Four to 24 hours prior to loading of SVF into a bioreactor, the system is primed with phosphate buffered saline (PBS) and subsequently loaded with approximately 30 ml cryoprecipitate (Blood Bank, Rigshospitalet, Denmark) for coating of the bioreactor. The cryoprecipitate is used as is or diluted, e.g., by 1:3 or 1:4, such as to a total of 100 ml, with PBS. Before loading the cells, the PBS and cryoprecipitate is washed out of the system and replaced with complete medium (Minimum Essential Medium, MEM Alpha (αMEM) without Ribonucleosides and Deoxyribonucleosides, (Gibco, Life Technologies), 1% Penicillin/Streptomycin (Gibco, Life Technologies), 5% human platelet lysate (Stemulate, Cook General Biotechnology). Gas is provided to the system as a pre-mixed supply of 20% $O_2$, 5% $CO_2$ and balanced with N2 (Strandmøllen, Denmark).

100 million SVF diluted in 100 ml complete medium are transferred to a cell inlet bag using a 60 ml syringe and loaded into the Quantum bioreactor. Cells are allowed to attach for 24 h, after which continuous feeding with media is activated. Media feeding rate starts at 0.1 mL/min. Based on glucose and lactate measurements feeding rate is adjusted and expansion of cells identified. Glucose and lactate levels are monitored by removing samples from the Quantum bioreactor sample port and taking measurements on a blood gas analyzer ABL 835 FLEX (Radiometer, Denmark). Approximately 9 days after loading of cells ASCs are harvested by loading a TrypLE® Select (Gibco, Life Technologies) into the system. The harvest process includes a washout of the system with PBS, the addition of 180 mL TrypLE® Select, and 20 minutes incubation. Harvested cells are washed into the cell harvest bag. Cells from the harvest bag are transferred into centrifuge tubes in Laminar air flow, washed, pelleted and counted and tested for viability with a NucleoCounter.

First passage intermediate ASCs are pelleted and re-suspended in CryoStor10 (BioLifeSolutions) in a concentration of 10 million cells per ml. This solution is aliquoted into CellSeal cryo vials (Cook General Biotechnology) in a total volume of 5 ml per vial.

The cryo vials are then frozen in a controlled rate freezer (Kryo 560-16, Planer) to attain −80° C. and are transferred on dry ice to a liquid nitrogen dry-storage Isothermal Liquid Nitrogen Freezer (V1500-AB, CBS) which provides uniform temperatures in the −180° C.-range, with no liquid nitrogen in the sample storage space. This system minimises the risk of cross contamination.

Cryostored first passage intermediate products constitute the working cell bank and are stored until loading for second bioreactor expansion.

Second Passage Expansion

Four to 24 hours prior to loading of first passage intermediate ASCs for second passage expansion, a new bioreactor is primed and coated as described for first passage expansion. The system is loaded with complete medium and gas is provided to the system as a pre-mixed supply of 20% $O_2$, 5% $CO_2$ and balanced with N2. One CellSeal vial holding 50 million first passage ASCs is removed from the nitrogen tank. The ampoule of cells is transferred to a "zip bag" and thawed in a 37° C. water bath. The seal from the bottom of the vial is removed and disinfected with alcohol. A piece of tubing is cut from the air vent, to avoid too much pressure on the cells. With a 10 ml syringe and a 16G needle, a predetermined amount of the cells (e.g., 1 quarter of the ampoule, 1 half of the ampoule or the entire ampoule) are drawn and transferred to a 10 ml centrifuge tube. Cells are counted and viability is determined with a NucleoCounter. Cells are diluted with 100 ml complete medium and are transferred to the Cell Inlet using a 60 ml syringe. Expansion and harvest is performed as described for first passage expansion.

After approximately 7 days of second passage expansion ASCs are harvested, cells are pelleted and re-suspended in CryoStor10 at a concentration of about 22 million cells per ml, typically in the range of about 20 to about 24 million cells per mL. This solution is aliquoted into CellSeal cryovials in a total volume of 5 ml per vial, holding about 110 million cells per vial, typically in the range of about 100 to about 120 million cells per vial.

The cryovials are then frozen in a controlled-rate freezer to attain −80° C. and are transferred on dry ice to a liquid nitrogen dry-storage container which provides uniform temperatures in the −180° C.-range, with no liquid nitrogen in the sample storage space. Cryo stored second passage ASCs constitute the investigational medicinal product CSCC_ASC and are stored in the product cell bank until shipment for clinical use.

The product is ready for use and requires only minimal handling at the bed side. A frozen vial is thawed in a 37° C. water bath in/near the operation room. The vial is sterilised (typically with an alcohol swab) and the cell suspension is aspirated with a needle into a sterile syringe. The syringe is then connected to the injection catheter and administered to the patient.

Example 2

Characterisation of ASC Product—Cell Surface Markers

Immunophenotyping was used to identify cell quality and was performed on the first passage intermediate product and the second passage final product before and after cryopreservation for ASC product prepared according to Example 1.

Harvested cells were washed, filtered, and distributed to tubes with or without antibodies. The cells were incubated for 30 min. at room temperature with antibodies shown in Table 1. After incubation, the cells were washed, centrifuged, and re-suspended in PBS for flow cytometry using a six-colour protocol.

According to the European Pharmacopeia, flow cytometry is a suitable method for identification of cell surface markers. Fluorescence-labelled antibodies against surface markers recommended by ISCT/IFATS (International Federation for Adipose Therapeutics and Science and the International Society for Cellular Therapy) for identification of ASCs were added to the ASCs and cell-associated fluorescence was measured using a flow cytometer.

For characterisation of given product, a compensated 6 colour protocol labelling cells with fluorophores Phycoerythrin, Flourescein Isothicyanate, Phycoerythrin-Texas Red, Phycoerythrin-cyanin and Allophycocyanin is used. Viability was determined by SYTOX blue staining. The protocol was developed with manual compensation, isotypic controls and Fluorescence Minus One controls. Dead cells and doublets were excluded from the final analysis. Data was collected and analysed using a GMP compliant Navios (Beckman Coulter, Germany Data was analysed using Navios software and Kaluza (Beckman Coulter, Germany).

TABLE 1

Surface markers on first passage intermediate ASCs from 5 different donors.

| | Donor 1 | Donor 2 | Donor 3 | Donor 4 | Donor 5 | Mean of 5 donors |
|---|---|---|---|---|---|---|
| Primar surface markers (percentage of total population) | | | | | | |
| Viability | 96 | 92 | 98 | 98 | 97 | 96 |
| CD45 | 1 | 1 | 1 | 1 | 0 | 1 |
| CD34 | 13 | 4 | 5 | 8 | 0 | 6 |

TABLE 1-continued

Surface markers on first passage intermediate ASCs from 5 different donors.

|  | Donor 1 | Donor 2 | Donor 3 | Donor 4 | Donor 5 | Mean of 5 donors |
|---|---|---|---|---|---|---|
| CD105 | 100 | 100 | 100 | 100 | 100 | 100 |
| CD90 | 100 | 100 | 100 | 100 | 100 | 100 |
| CD73 | 100 | 100 | 100 | 99 | 100 | 100 |
| CD13 | 99 | 100 | 100 | 100 | 100 | 100 |
| HLA-DR | 3 | 1 | 4 | 2 | 1 | 2 |
| CD19 | 1 | 0 | 0 | 0 | 0 | 0 |
| CD14 | 1 | 0 | 3 | 0 | 1 | 1 |
| Secondary surface markers (percentage of total population) | | | | | | |
| CD29 | 100 | 100 | 100 | 100 | 99 | 100 |
| CD166 | 99 | 100 | 100 | 99 | 100 | 100 |
| CD146 | 30 | 15 | 34 | 43 | 81 | 41 |
| CD106 | 3 | 1 | 4 | 2 | 2 | 2 |
| CD31 | 2 | 2 | 3 | 2 | 0 | 2 |
| CD36 | 14 | 10 | 17 | 8 | 12 | 12 |

TABLE 2

Surface markers on second passage final ASCs from 3 different donors before cryopreservation

|  | Donor 1 | Donor 2 | Donor 3 | Mean of 3 donors |
|---|---|---|---|---|
| Primary surface markers (percentage of total population) | | | | |
| Viability | 96 | 97 | 98 | 97 |
| CD45 | 0 | 1 | 1 | 1 |
| CD34 | 1 | 0 | 1 | 1 |
| CD105 | 100 | 100 | 100 | 100 |
| CD90 | 100 | 100 | 100 | 100 |
| CD73 | 100 | 100 | 100 | 100 |
| CD13 | 100 | 100 | 100 | 100 |
| HLA-DR | 0 | 1 | 3 | 1 |
| CD19 | 0 | 0 | 0 | 0 |
| CD14 | 0 | 0 | 0 | 0 |
| Secondary surface markers (percentage of total population) | | | | |
| CD29 | 100 | 100 | 100 | 100 |
| CD166 | 100 | 100 | 100 | 100 |
| CD146 | 25 | 15 | 23 | 21 |
| CD106 | 1 | 1 | 1 | 1 |
| CD31 | 1 | 1 | 1 | 1 |
| CD36 | 3 | 3 | 8 | 5 |

TABLE 3

Surface markers on second passage final ASCs from 3 different donors directly after cryopreservation

|  | Donor 1 | Donor 2 | Donor 3 | Mean of 3 donors |
|---|---|---|---|---|
| Primary surface markers (percentage of total population) | | | | |
| Viability | 95 | 96 | 95 | 95 |
| CD45 | 0 | 0 | 0 | 0 |
| CD34 | 1 | 0 | 0 | 0 |
| CD105 | 100 | 100 | 100 | 100 |
| CD90 | 100 | 100 | 100 | 100 |
| CD73 | 100 | 100 | 100 | 100 |
| CD13 | 100 | 100 | 100 | 100 |
| HLA-DR | 0 | 0 | 0 | 0 |
| CD19 | 0 | 0 | 0 | 0 |
| CD14 | 0 | 0 | 0 | 0 |
| Secondary surface markers (percentage of total population) | | | | |
| CD29 | 100 | 100 | 100 | 100 |
| CD166 | 100 | 100 | 100 | 100 |
| CD146 | 29 | 40 |  | 51 |
| CD106 | 0 | 0 | 0 | 0 |
| CD31 | 0 | 0 | 0 | 0 |
| CD36 | 3 | 3 | 3 | 3 |

Example 3

Characterisation of ASC Product—Cell Viability

Product quality and the effect of the final product are subject to viability of ASCs. Thus viability is significant throughout the manufacturing process.

Viability was determined several times during the production process of Example 1; viability of SVF was determined before loading into the bioreactor for first expansion; viability of first passage expanded ASC was determined after harvest and after thawing and load into second passage; viability of final product was determined after harvest and after cryopreservation and thaw. Percentage viability was determined with a NucleoCounter® NC-100™. The NucleoCounter is an image cytometer based on detection of fluorescence from the DNA binding fluorescent dye, Propidium Iodide (PI).

TABLE 4

Viability of SVF and ASC during the manufacturing process

| Production step | Viability (%) |
|---|---|
| SVF (n = 3) | 86 ± 3 |
| First passage ASC After harvest (n = 3) | 89 ± 2 |
| First passage ASC After cryopreservation (n = 10) | 90 ± 2 |
| Second passage ASC After harvest (n = 10) | 90 ± 3 |
| Second passage ASC After cryopreservation (n = 2) | 91 ± 2 |

Example 4

Differentiation Assays

The osteogenic, adipogenic, and chondrogenic differentiation capacity of second passage ASCs expanded with Stemulate as a growth supplement in Quantum bioreactors was determined using StemPro differentiation kit (Gibco, Life Technology), according to the manufacturer's protocols.

For osteogenic differentiation, 10,000 ASCs/well in 12-well plates were incubated in osteogenic induction medium (StemPro Osteocyte/Chondrocyte Differentiation Basal Medium, StemPro Osteogenesis Supplement, Penicillin/Streptomycin). For adipogenic differentiation, 20,000 ASCs/well in 12-well plates were incubated in adipogenic induction medium (StemPro Adipocyte Differentiation Basal Medium, StemPro Adipocyte Supplement, Penicillin/Streptomycin). For chondrogenic differentiation, multiple 5 μl drops of 80,000 ASCs were incubated in chondrogenic induction medium (StemPro Osteocyte/Chondrocyte Differentiation Basal Medium, StemPro Chondrogenesis Supplement, Penicillin/Streptomycin). Cells were induced for 21 days, with medium changed every 3-4 days. Control cells were incubated with complete medium without supplement until confluent.

Osteogenic differentiation was documented as cells showed calcium deposits with Alizarin Red S stain (Sigma-Aldrich). Adipogenic differentiation was documented through the morphological appearance of fat droplets stained with Oil Red O (Sigma-Aldrich). Chondrogenic differentiation was documented as cells were stained with Alcian Blue 8GX (Sigma-Aldrich). Control cells maintained in complete media were all negative.

Example 5

Comparison of Cryoprotectant Formulations

Viability and function of ASCs in the final cryopreserved product upon thaw at the bed side is of primary importance for product efficacy. Viability and function was determined for cryopreserved ASC with the use of different cryoprotectant formulations.

First passage intermediate ASCs and second passage final ASC products were manufactured as described in Example 1. Intermediate ASCs were frozen in different cryoprotectant formulations $50 \times 10^6$ cells per 5 mL in cryo vials.

Second passage final ASCs were frozen in different cryo formulations $100 \times 10^6$ cells per 5 mL in cryo vials. Cells were frozen in an automated freezer to −80° C., stored in liquid nitrogen dry-storage and thawed in a 37° C. water bath; viability and recovery was determined immediately upon thawing and up till 3 hours after thawing while kept in cryo formulation at room temperature.

Immediately after thawing and up till 3 hours after thawing, while kept in cryo formulation at room temperature, final ASC cell product was washed and put in culture for identification of cell function as determined by in vitro morphology, adherence and proliferation. Cultures were established with $1 \times 10^6$ cells per T75 flask with 20 ml complete medium, 37° C., 5% $CO_2$.

Viability and recovery was determined with a Nucleocounter. Morphology and adhesion was determined by microscopy 24 h after cells were put in culture. Proliferation was determined by detachment and counting of cells with a Nucleocounter 48 h after they were put in culture. Cryoformulations containing 5% or 10% HPL or human albumin (HA) and DMSO in isotonic saline, CryoStor10 and CryoStor5 were tested.

TABLE 5

Recovery and viability immediately after thawing of intermediate first passage ASCs ($50 \times 10^6$ cells/5 ml) in different cryo formulations

| $50 \times 10^6$ N = 3 | 10% HA | 5% HA | CryoStor10 |
|---|---|---|---|
| % recovery | 97% | 96% | 94% |
| % viability | 93% | 90% | 90% |

TABLE 6

Recovery and viability immediately after thawing of second passage final ASCs ($100 \times 10^6$ cells/5 mL) in different cryo formulations.

| $100 \times 10^6$ (N = 1) | | 10% HA | 5% HA | CryoStor10 |
|---|---|---|---|---|
| Immediately after thaw | % recovery, 0 hr | 107% | 104% | 108% |
| | % viability, 0 hr | 91% | 92% | 91% |
| 3 h after thaw | % recovery, 3 hr | 106% | 105% | 95% |
| | % viability, 3 hr | 87% | 87% | 82% |

TABLE 7

Viability and recovery of second passage ASC final product cells ($100 \times 10^6$ ASC/5 ml). Three different donor cryopreserved in CryoStor10. Viability and recovery measured immediately after thawing (0 h) and 1, 2 and 3 h after thawing and storage in cryoprotectant formulation at RT.

| % Viability | 0 hr | 1 hr | 2 hr | 3 hr | % Recovery | 0 hr | 1 hr | 2 hr | 3 hr |
|---|---|---|---|---|---|---|---|---|---|
| Donor1 | 91% | | | 82% | D1 | 108% | | | 95% |
| Donor2 | 88% | 84% | 82% | 82% | D2 | 100% | 90% | 85% | 92% |
| Donor3 | 90% | 87% | 85% | 83% | D3 | 99% | 106% | 105% | 113% |
| Average | 90% | 86% | 84% | 82% | Average | 102% | 98% | 95% | 100% |

Function and potency of cells are the best predictors of clinical efficacy. With present available in vitro methods, morphology, attachment and proliferation are the best overall indicators of cell function. Microscopic examination revealed that cell function (morphology, adhesion and proliferation) was superior for cells formulated in CryoStor10.

TABLE 8

Proliferation of intermediate first passage ASCs frozen in different cryoprotectant formulations. $1 \times 10^6$ Cells were put in culture immediately after thawing and proliferation was determined after 48 h (n = 3).

| $50 \times 10^6$ | 10% HA | 5% HA | CryoStor10 |
|---|---|---|---|
| Cell number: | $4.94 \times 10^5$ | $6.49 \times 10^5$ | $1.61 \times 10^6$ |

TABLE 9

Proliferation of second passage final ASCs frozen in different cryo formulations. $1 \times 10^6$ Cells were put in culture immediately after thawing and proliferation was determined after 48 h (n = 1).

| | $100 \times 10^6$ | 10% HA | 5% HA | CryoStor10 |
|---|---|---|---|---|
| Cell number 0 hr | | $1.17 \times 10^6$ | $7.96 \times 10^5$ | $1.73 \times 10^6$ |
| Cell number 3 hr | | $3.65 \times 10^5$ | $2.11 \times 10^5$ | $7.05 \times 10^5$ |

TABLE 10

Proliferation of second passage ASC final product cells ($100 \times 10^6$ ASC/ 5 ml). ASCs from three different donor cryopreserved in CryoStor10. Proliferation measured with cells put in culture immediately after thawing (0 h) and 1, 2 and 3 h after thawing and storage in cryo formulation at RT. $1 \times 10^6$ ASCs were plated in T75 flasks and counted after 48 hr.

| | 0 hr | 1 hr | 2 hr | 3 hr |
|---|---|---|---|---|
| Donor1 | $1.73 \times 10^6$ | | | $7.05 \times 10^5$ |
| Donor2 | $2.72 \times 10^6$ | $2.15 \times 10^6$ | $1.92 \times 10^6$ | $1.49 \times 10^6$ |
| Donor3 | $3.59 \times 10^6$ | $2.14 \times 10^6$ | $2.08 \times 10^6$ | $1.89 \times 10^6$ |
| Average | $2.68 \times 10^6$ | $2.15 \times 10^6$ | $2.00 \times 10^6$ | $1.36 \times 10^6$ | versions, heparin-requiring PL-S and the non-heparin-requiring PL-SP, where some of the clotting factors have been removed and addition of heparin is not required.

The cells were incubated under standard conditions at 37° C. in humid air with 5% CO2. The medium of ASCs was changed after 2 days to discard of non-adherent cells, and subsequently every 3-4 days. When the culture reached a confluence level of approximately 90%, cells were washed with PBS, detached and passaged for experimental setups. Proliferation was determined day 1, 2, 3, 5 and 7 by manual counting in a Bürker-Türk chamber. Population doublings (PD), were calculated as PD=ln (N/N0)/ln 2, where N is the harvested cell number at day 7 and N0 is the seeded cell number. Osteogenic, adipogenic, and chondrogenic differentiation capacity of ASCs was determined using StemPro differentiation kit. Immunophenotyping was determined as described in Example 2. Genomic stability was determined by Comparative Genomic Hybridization.

TABLE 11

Proliferation of ASCs in media with different growth supplements.

| N = 3 | SVF seeded | ASC P0 harvested | Mean Days in culture | ASC:SVF ratio | ASC P0 seeded | ASC P1 harvested | Mean days in culture | PD |
|---|---|---|---|---|---|---|---|---|
| PLTMax | 4.5E+06 | 6.8E+06 ± 3.7E+05 | 7 ± 0 | 1.51 | 3.5E+05 | 5.0E+06 ± 5.1E+05 | 7 ± 0 | 3.8 |
| hPL-S | 4.5E+06 | 6.6E+06 ± 1.1E+06 | 7 ± 0 | 1.47 | 3.5E+05 | 4.6E+06 ± 7.4E+05 | 7 ± 0 | 3.7 |
| hPL-SP | 4.5E+06 | 5.2E+06 ± 8.1E+05 | 7 ± 0 | 1.16 | 3.5E+05 | 4.1E+06 ± 3.4E+05 | 7 ± 0 | 3.5 |
| FBS | 4.5E+06 | 5.1E+06 ± 1.1E+06 | 7 ± 0 | 1.13 | 3.5E+05 | 1.3E+06 ± 3.7E+05 | 23 ± 2.2 | 1.9 |

Example 6

Comparison of Growth Supplements

SVF was isolated from lipoaspirate obtained from three healthy female donors (age between 32-47 years; mean age 40 years) as described in example 1. The SVF was cultured in four different GMP-compliant media containing 5% hPL or 10% FBS. ASCs P0, P1 and P5 were characterised and used for analysis.

Primary cell cultures of ASCs were established seeding 4.5×106 SVF/T75-flask in complete medium containing Minimum Essential Medium, MEM Alpha (αMEM), 1% Penicillin/Streptomycin and with four different growth supplements:
1. 5% Human platelet lysate (PLTMax, Mill Creek Life Sciences), 10 IU heparin
2. 5% Human platelet lysate (Stemulate, hPL-S, COOK General Biotechnology), 10 IU heparin
3. 5% Human platelet lysate (Stemulate, hPL-SP, COOK General Biotechnology)
4. 10% Fetal Bovine Serum (FBS, Gibco, Life Technologies)

HPL is comprised of plasma with fibrinogen and other clotting factors, therefore heparin must be added to prevent gelatinization. COOK General Biotechnology produces Stemulate™ pooled human platelet lysate in two different As illustrated in Table 11, the use of any HPL product is clearly a more effective growth supplement in terms of proliferative capacity than the use of FBS.

ASCs cultured with all tested growth supplements at passage one proved to have comparable and ASC characteristic immunophenotypic profiles and maintained their tri-lineage differentiation capacity. Genomic stability as identified by Comparative Genomic Hybridization (CGH) shows that ASCs expanded in vitro, in the presence of PLTMax, Stemulate and FBS did not show any imbalanced chromosomal rearrangements when cultured until fifth passage. Thus the higher proliferative capacity of ASCs cultured in PLTMax or Stemulate did not compromise genomic stability.

Example 7

Comparison of Manual and Automated Expansion in Bioreactors

SVF was isolated from abdominal fat, suspended in basal medium supplemented with Penicillin/Streptomycin and a serum-containing growth supplement and seeded onto either T75 flasks or in a Quantum bioreactor that had been coated with cryoprecipitate. The cultivation of ASCs passaged from SVF was performed via three methods: flask to flask; flask to bioreactor; and bioreactor to bioreactor. In all cases, quality controls were conducted by testing sterility, mycoplasma, and endotoxin, in addition to the assessment of cell counts, viability, and immunophenotype as determined by flow cytometry.

Primary flask cultures were established by seeding $4.5 \times 10^6$ SVF cells per T75-flask incubated under standard conditions at 37° C., 5% CO2. The culture medium was changed after 3 days removing non-adherent cells. Subsequently, the medium was changed every 3-4 days throughout the remainder of the culture. Reaching a confluence level of 90% cells were harvested. Cells were re-seeded at $3.5 \times 10^5$ cells/T75-flask. Viability and yield for ASCs at passage 0 (P0) and passage 1 (P1) was determined with a NucleoCounter® NC-100™ and calculated as means of three T75 flasks.

For primary expansion of SVF in the Quantum bioreactor, the system was primed and coated with cryoprecipitate as described in example 1. $100 \times 10^6$ cells from SVF were loaded and allowed to attach for 24 hours, before feeding at 0.1 mL/min started automatically. After 3 days cultivation, a washout task was made to remove the non-adherent cells. For second passage expansion of pre-cultured ASCs (i.e., those resulting from the primary expansion), the Quantum bioreactor was seeded with $30 \times 10^6$ ASC. Expansion of SVF and ASC performed in the Quantum bioreactor used media and reagents that were identical with those used for flask culture.

to manual processing in T-flasks, while maintaining the purity and quality essential to safe and robust cell production.

Example 8

Comparison of Growth Supplements in Quantum Bioreactors

The use of HPL (Stemulate, hPL-SP, heparin-free, COOK General Biotechnology) and Fetal Bovine Serum (FBS) (Gibco, Life Technology) as growth supplements for expansion of ASCs in a Quantum bioreactor were compared.

From three-donor lipoaspirations, isolation of SVF from abdominal fat and first passage expansion was performed according to Example 1. From these passages $30 \times 10^6$ ASCs were reloaded to a new Quantum bioreactor for second expansion. In all passages metabolic monitoring (glucose and lactate) guided feeding rate and time of harvest. Viability, sterility, purity, differentiation capacity and genomic stability of ASCs were determined. Microbial quality control, flow cytometry, triple differentiation and genomic stability as determined by comparative genomic hybridization array assays were performed.

TABLE 12

Comparison of SVF and ASC yield in manual flask culture and automated bioreactor expansion

| N = 3 | SVF seeded ± STD | SVF seeded per cm2 | Mean days in culture ± STD | ASC harvested from first passage ± STD | Viability | ASC:SVF ratio |
|---|---|---|---|---|---|---|
| Quantum | $5.56 \times 10^7 \pm 1.76 \times 10^7$ | $2.66 \times 10^3$ | $15 \pm 9$ | $8.98 \times 10^7 \pm 4.88 \times 10^7$ | 96% | 1.7 |
| Flasks | $4.50 \times 10^6 \pm 0$ | $6.00 \times 10^4$ | $9 \pm 2$ | $1.75 \times 10^6 \pm 1.08\ 10^6$ | 97% | 0.4 |

| N = 3 | ASC seeded for second expansion ± STD | ASC seeded per cm2 | Mean days in culture | ASC harvested from second passage ± STD | Viability | PD |
|---|---|---|---|---|---|---|
| Q-Q | $2.10 \times 10^7 \pm 0$ | $1.00 \times 10^3$ | $18 \pm 6$ | $9.53 \times 10^7 \pm 5.77 \times 10^6$ | 96% | 2.13 |
| F-F | $3.50 \times 10^5 \pm 0$ | $4.67 \times 10^3$ | $17 \pm 6$ | $7.53 \times 10^5 \pm 7.71 \times 10^4$ | 98% | 1.08 |
| F-Q | $2.10 \times 10^7 \pm 0$ | $1.00 \times 10^3$ | $17 \pm 6$ | $9.91 \times 10^7 \pm 1.28 \times 10^7$ | 97% | 2.23 |

The viability of ASCs P0 and P1 was above 96%, regardless of cultivation in flask or bioreactor. ASCs expanded under all conditions proved to have comparable and ASC characteristic immunophenotypic profiles. Sterility, *mycoplasma* and endotoxin tests were consistently negative.

However, an average of $55 \times 10^6$ SVF cells loaded into a bioreactor yielded $89 \times 10^6$ ASCs P0 (1.6 times higher number of ASCs relative to the number of SVF cells seeded), while $4.5 \times 10^6$ SVF seeded per T75 flask yielded an average of $1.75 \times 10^6$ ASCs (0.4 times the number of ASCs relative to the number of SVF cells seeded). ASCs P1 expanded in the Quantum bioreactor demonstrated a population doubling (PD) around 2.1 regardless of whether P0 was cultured in flasks or in the Quantum bioreactor, while ASCs P1 in flasks only reached a PD of 1.0.

In conclusion, manufacturing of ASCs in a bioreactor enhances ASC expansion rate and yield significantly relative Each passage of this two-passage process demonstrated that HPL supported proliferation of ASCs to a greater extent than FBS. As an average of 3 donors, cultivation of SVF in HPL-media for 9 (7-11) days yielded in average $546 \times 10^6$ ASCs. Cultivation of the SVF in FBS-media required 8 days more to yield $111 \times 10^6$ ASCs. Second passage ASCs yielded in average $800 \times 10^6$ cells (PD 5.2) after 6 days in hPL-media compared to $100 \times 10^6$ (PD: 2.2) cells in FBS-media after 21 days. ASCs fulfilled ISCT criteria in both media types (immunophenotype and triple differentiation). Comparative genomic hybridization demonstrated genomic stability. Sterility, *mycoplasma* and endotoxin tests were all negative.

Combining the use of Quantum bioreactors and hPL, 5 times more first passage ASCs and 8 times more second passage ASCs were retrieved as compared to the use of Quantum bioreactors and FBS.

Example 9

Immunosuppressive Activity of Final ASC Product

A manifest during tissue damage of any origin, be it ischemic, traumatic or autoimmune by nature, is the prompt appearance of inflammatory cells, slowly diminishing during the successful process of regeneration but persisting during chronic ischemic/traumatic wound healing and the autoimmune reaction. This infiltrate consists of an initial accumulation of monocytes/macrophages followed by lymphocytes. As such immunosuppression exerted by an ASC product on especially the monocyte/macrophage population is expected to change the balance in favour of regeneration. ASC immunosuppressive activity is likewise imperative for allograft survival and thereby a multitude of regenerative mechanisms.

As immunosuppression is an inherent ASC characteristic of interest for both allogeneic use and efficacy, in vitro cell models which address innate and cellular immunity, such as human dendritic cell assays and human mixed lymphocyte reactions were used to examine the immunosuppressive activity.

Co-cultures with ASCs and dendritic cells (DCs) derived from circulating monocytes were established according to method by Jensen and Gad (2010). Peripheral blood mononuclear cells were isolated from buffy coats from healthy donors below age 50 years, by centrifugation over a Ficoll-Paque gradient (GE Healthcare) and isolation of the cellular interface. The cells were washed in RPMI 1640 (Roswell Park Memorial Institute) medium (Sigma) with 1% pen/strep, and CD14+ monocytes were isolated by positive selection using a MACS separation column and magnetic beads (CD14 MACS microbeads, human, Miltenyi Biotec). The column was washed with degassed PBSE buffer (PBS, 0.5 mol/L EDTA, 2% FBS), before and after applying the cell suspension. CD14+ monocytes were seeded in six-well plates at a density of $2 \times 10^6$ cells/mL in RPMI 1640 medium with 1% pen/strep, 2% human AB serum, human recombinant granulocyte macrophage colony stimulating factor (20 ng/mL) and human interleukin (IL)-4 (20 ng/mL; Pepro-Tech). The medium was changed every 2-3 days. After 6 days of differentiation the cells were harvested, and prepared for DC:ASC co-culture. The cell product CSCC_ASC; second passage cryopreserved ASCs (in CryoStor10) was thawed and cells were put in flask culture ($\alpha$MEM, 5% Stemulate, 1% pen/strep) for a week before DC:ASC co-culture was initiated (culture rehabilitated ASCs). On the day of DC:ASC co-culture a vial of cell product CSCC_ASC; second passage cryopreserved ASCs (in CryoStor10) was thawed for direct use in co-cultures. ASCs were seeded in a 48-well plate in a concentration of $1 \times 10^6$ per well, resulting in a ratio of DC to ASC of 1:1. DCs were activated by stimulation with 1 µg/mL lipopolysaccharide (LPS; Sigma) and 20 ng/mL interferon-gamma (IFN-g; Peprotech). As a positive control for DC activation, one well containing DCs only was equally stimulated with 1 µg/mL lipopolysaccharide (LPS; Sigma) and 20 ng/mL interferon-gamma (IFN-g; Peprotech) and incubated for 24 h.

Flow Cytometry of Dendritic Cell Maturation Markers

Co-cultures were harvested by resuspending and removing supernatant and scraping the bottom of the wells with a bended pipette tip. The harvested cells were washed twice with FACS wash buffer (PBS supplemented with 1.5% NaN3 and 1% heat-inactivated FBS). The samples were incubated with human IgG (Sigma) on ice for 15 min to block Fc receptors. The primary antibodies used were IgG-APC, CD11c-APC, IgG1k-PE, CD40-PE, CD80-PE, CD86-PE (BD Bioscience) and HLA-DR-FITC (Beckman Coulter). The samples were incubated with antibodies for 30 min on ice and washed, and data were acquired on a FACS Accuri (BD Bioscience). Data were acquired on events gated as the DC population by CD11c positivity and size and analysed in Flowlogic. Mean fluorescent intensity (MFI) was measured, and compared to the MFI of positive control DCs.

TABLE 13

| | Marker | | | |
|---|---|---|---|---|
| | CD40 | CD80 | CD86 | HLA-dr |
| | Expression in percentage of stimulated DCs ± STD | | | |
| Treatment | N = 5 | | | |
| DC unstimulated (control) | 66 ± 21 | 16 ± 6 | 65 ± 31 | 71 ± 27 |
| DC stimulated (positive control) | 100 | 100 | 100 | 100 |
| DC stimulated Co-cultured w. ASCs directly from cryostorage | 78 ± 17 | 59 ± 9 | 65 ± 24 | 78 ± 20 |
| DC stimulated Co-cultured w. culture rehabilitated ASCs | 67 ± 18 | 42 ± 8 | 50 ± 21 | 60 ± 33 |

Human dendritic cell assays showed that second passage final and cryo formulated ASC product suppressed human dendritic cells maturation/activation. This designated that the cell product was actively immunosuppressive and would escape rejection after in vivo injection. Experiments were performed with the final product directly after thawing and with ASCs from the final and thawed product that had been put in culture to rehabilitate. The influence of ASC formulation and cryogenic storage with regard to activation of dendritic cells had thereby been addressed.

Immunosuppressive activity of the second passage final ASC product was further examined in an in vitro cellular model based on a mixed lymphocyte reaction (MLR). In this model, circulating peripheral blood mononuclear cells (PBMCs) were stimulated by irradiated PBMCs from an allogeneic donor and different ratios of final ASC product was added. Briefly, ASCs were cultured in 96-well plates in ratios corresponding to 1:20 to 1:1 of the following responder PBMCs. Wells without ASCs (medium only) were used as positive controls. The day after peripheral blood mononuclear cells (PBMC) were purified from buffy coats by means of density gradient centrifugation using Lymphoprep. Half of each PBMC pool was irradiated with a gamma radiation source (3000 RAD). PBMCs were combined in 96-well plates (100 µl+100 µl per well) to make a number of unique MLRs; proliferative PBMC pools were challenged by irradiated pools from other donors. After a 4-day co-culture period, 3H-thymidine (25 pSi/ml) was added and incubated for 18-20 hours. Using an automated harvester, cells were harvested onto filter plates, put in scintillation fluid and counts per minute, visualizing PBMC proliferative responses, were determined with a scintillation counter (Topcount).

Addition of second passage final ASC product to MLR demonstrated that ASCs exert suppressive effects on the rapid lymphocyte proliferation that normally occurs.

TABLE 14

MLR with escalating doses of second passage ASCs, starting with 1 ASC per 20th PBMC responder. Data normalised to MLR with no ASCs present. N = 5 ASC donors

| MLR DATA Ratio | Mean | Std. Error of Mean | N MLR reactions |
|---|---|---|---|
| No ASC | 100% | 0 | 30 |
| ASC 1:20 | 75% | 0.09 | 30 |
| ASC 1:10 | 72% | 0.07 | 30 |
| ASC 1:5 | 53% | 0.09 | 30 |
| ASC 1:1 | 21% | 0.05 | 30 |

Example 10

Immunomodulatory Phenotyping of Final Product/Second Passage ASCs

Phenotypic characterisation of final product CSCC_ASC, prepared according to Example 1, based on immunomodulatory surface markers was performed by flow cytometry. ASCs were harvested with TrypleSelect, washed, filtered, and distributed to tubes with or without antibodies. The cells were incubated for 30 min. at room temperature with antibodies shown in Table 15. After incubation, the cells were washed, centrifuged, and re-suspended in PBS for flow cytometry.

A single colour protocol labelling cells with antibodies conjugated to fluorophores like Phycoerythrin, Flourescein Isothicyanate, Phycoerythrin-Texas Red, Phycoerythrin-cyanin, Allophycocyanin and Brilliant Violet (conducting polymers) were used. Viability was determined by FVS-780 staining (Becton Dickinson). Dead cells and doublets were excluded from the final analysis. Data was collected and analysed using a GMP compliant Navios (Beckman Coulter, Germany) Data were analysed using Navios software and Kaluza (Beckman Coulter, Germany).

TABLE 15

| Marker | Minimum expression Percentage of population N = 3 | Maximum expression Percentage of population N = 3 |
|---|---|---|
| CD10 | 99 | 100 |
| CD140b | 99 | 100 |
| CD15 | 0 | 3 |
| CD152 | 0 | 9 |
| CD160 | 99 | 100 |
| CD163 | 0 | 2 |
| CD18 | 0 | 1 |
| CD200 | 10 | 28 |
| CD204 | 99 | 100 |
| CD258 | 80 | 100 |
| CD270 | 65 | 90 |
| CD272 | 99 | 100 |
| CD274 | 2 | 13 |
| CD39 | 0 | 1 |
| CD40 | 0 | 1 |
| CD44 | 99 | 100 |
| CD49a | 88 | 100 |
| CD54 | 98 | 100 |
| CD62L | 0 | 1 |
| CD80 | 0 | 1 |
| CD86 | 0 | 7 |
| CD9 | 94 | 100 |
| CXCR4 | 1 | 20 |
| Galectin 3 | 99 | 100 |
| Galectin 9 | 99 | 100 |
| HLA-ABC | 99 | 100 |
| HLA-DR, DQ, DP | 0 | 1 |
| HLA-G | 99 | 100 |
| LTβR | 99 | 100 |

CXCR4: C—X—C chemokine receptor type 4
LTβR: Lymphotoxin Beta Receptor

The CD markers shown in Table 15 have all been chosen for their relevance in immunomodulatory and especially immunosuppressive functions. The ASC characterisation as shown in Table 15 is in accordance with a considerable immunosuppressive potential (Krampera et al., 2013). Especially the strong positive markers CD10, CD140a, CD160, CD204, CD258, CD270, CD272, CD44, CD49a, CD54, CD9, Galectin 3 and Galectin 9, HLA-G and LTβR reflects ASC immunomodulatory capacities through mechanisms like immune signalling, cell-cell and cell-ECM adhesion, homing, pattern recognition, T cell inhibition, up regulation of growth factor receptors and inactivation of pro-inflammatory proteins.

Example 11

Immunomodulatory Functional Capacities; Phenotypical Adaptations to Pro-Inflammatory Environment In order to examine whether the immunomodulatory and immunosuppressive phenotype illustrated in Example 10 complies with actual immunosuppressive responsiveness, ASCs from the product CSCC_ASC, prepared according to Example 1, were challenged with a pro-inflammatory cytokine in vitro and phenotypical changes were examined.

Final product ASCs from different donors were cultured in vitro in standard medium (αMEM, Pen/Strep, 5% hPL). At about 80% confluence half of the cultures from each donor were stimulated with 50 ng/ml IFN-gamma, 25 ml medium per culture. After 3 days cultures were harvested with TrypleSelect and prepared for flow cytometry as described in Example 10.

TABLE 16

| Marker | Unstimulated ASCs | | IFN-γ stimulated ASCs | |
|---|---|---|---|---|
| | Minimum expression Percentage of population N = 3 | Maximum expression Percentage of population N = 3 | Minimum expression Percentage of population N = 3 | Maximum expression Percentage of population N = 3 |
| CD10 | 99 | 100 | 99 | 100 |
| CD140b | 99 | 100 | 99 | 100 |
| CD15 | 0 | 3 | 0 | 1 |
| CD152 | 0 | 9 | 1 | 8 |
| CD160 | 99 | 100 | 99 | 100 |
| CD163 | 0 | 2 | 0 | 1 |
| CD18 | 0 | 1 | 0 | 1 |
| CD200 | 10 | 28 | 12 | 20 |
| CD204 | 99 | 100 | 99 | 100 |
| CD258 | 80 | 100 | 86 | 90 |
| CD270 | 65 | 90 | 52 | 88 |
| CD272 | 99 | 100 | 93 | 99 |
| CD274 | 2 | 13 | 89 | 99 |
| CD39 | 0 | 1 | 0 | 1 |
| CD40 | 0 | 1 | 3 | 15 |
| CD44 | 99 | 100 | 99 | 100 |
| CD49a | 88 | 100 | 99 | 100 |
| CD54 | 98 | 100 | 99 | 100 |

TABLE 16-continued

|  | Unstimulated ASCs | | IFN-γ stimulated ASCs | |
| --- | --- | --- | --- | --- |
| Marker | Minimum expression Percentage of population N = 3 | Maximum expression Percentage of population N = 3 | Minimum expression Percentage of population N = 3 | Maximum expression Percentage of population N = 3 |
| CD62L | 0 | 1 | 0 | 1 |
| CD80 | 0 | 1 | 0 | 1 |
| CD86 | 0 | 7 | 1 | 4 |
| CD9 | 94 | 100 | 86 | 94 |
| CXCR4 | 1 | 20 | 1 | 3 |
| Galectin 3 | 99 | 100 | 98 | 100 |
| Galectin 9 | 99 | 100 | 99 | 100 |
| HLA-ABC | 99 | 100 | 99 | 100 |
| HLA-DR, DQ, DP | 0 | 1 | 90 | 93 |
| HLA-G | 99 | 100 | 99 | 100 |
| LTβR | 99 | 100 | 3 | 5 |

TABLE 17

|  | Percent of population Mean (n = 3) | | | Mean Flourescent Intensity (MFI) Mean (n = 3) | | | |
| --- | --- | --- | --- | --- | --- | --- | --- |
| Marker | Unstimulated ASC | IFN-γ stimulated ASC | Δ% | Unstimulated ASC | IFN-γ stimulated ASC | ΔMFI | Fold change MFI |
| CD10 | 100 | 100 | 0 | 28 | 43 | 15 | 1.5 |
| CD140b | 100 | 99 | −1 | 13 | 10 | −3 | 0.8 |
| CD15 | 2 | 1 | −1 | 1 | 2 | 1 | 2 |
| CD152 | 4 | 3 | −1 | 2 | 3 | 1 | 1.5 |
| CD160 | 100 | 100 | 0 | 4 | 4 | 0 | 1 |
| CD163 | 1 | 1 | −1 | 1 | 3 | 2 | 3 |
| CD18 | 0 | 1 | 0 | 4 | 4 | 0 | 1 |
| CD200 | 19 | 13 | −7 | 1 | 2 | 1 | 2 |
| CD204 | 100 | 100 | 0 | 4 | 4 | 0 | 1 |
| CD258 | 90 | 88 | −3 | 4 | 3 | −1 | 0.8 |
| CD270 | 78 | 70 | −8 | 3 | 3 | 0 | 1 |
| CD272 | 99 | 96 | −4 | 5 | 4 | −2 | 0.8 |
| CD274 | 8 | 94 | 87 | 2 | 3 | 1 | 1.5 |
| CD39 | 0 | 1 | 0 | 3 | 3 | 1 | 1 |
| CD40 | 0 | 8 | 8 | 3 | 2 | −1 | 0.7 |
| CD44 | 100 | 100 | 0 | 61 | 63 | 2 | 1 |
| CD49a | 93 | 100 | 6 | 3 | 8 | 5 | 2.7 |
| CD54 | 99 | 100 | 1 | 3 | 97 | 94 | 32 |
| CD62L | 0 | 0 | 0 | 2 | 5 | 3 | 2.5 |
| CD80 | 0 | 1 | 0 | 3 | 4 | 0 | 1.3 |
| CD86 | 4 | 2 | −2 | 2 | 2 | 1 | 1 |
| CD9 | 96 | 89 | −7 | 7 | 4 | −3 | 0.6 |
| CXCR4 | 8 | 2 | −6 | 2 | 2 | 1 | 1 |
| Galectin 3 | 100 | 99 | −1 | 6 | 5 | −1 | 0.8 |
| Galectin 9 | 100 | 100 | 0 | 4 | 3 | 0 | 0.8 |
| HLA-ABC | 100 | 100 | 0 | 14 | 181 | 167 | 13 |
| HLA-DR, DQ, DP | 0 | 92 | 91 | 6 | 24 | 18 | 4 |
| HLA-G | 100 | 100 | 0 | 4 | 5 | 1 | 1.25 |
| LTβR | 100 | 100 | 0 | 9 | 4 | −5 | 0.5 |

As shown in Table 16 and 17 final product ASCs are able to respond to an inflammatory environment. Responses are found on a population level as well as on individual cell level.

Percentage of population means the percentage of cells in the entire population that displays the mentioned surface marker. Mean Fluorescence Intensity numbers correspond to up- or down-regulation of the number of markers on each individual cell.

Of particular importance is that an 87% upregulation of CD274 (PD-L1) on a population basis illustrates the ability to initiate immunosuppressive actions. CD274, known for its expression on macrophages, plays a major role in suppressing the immune system during particular events such as tissue allografts and autoimmune diseases (Camillieri et al, 2016; Krampera et al., 2013). PD-L1 binds to its receptor, PD-1, found on activated T cells, B cells, and myeloid cells, and modulate activation or inhibit T cell proliferation. PD-L1 acts at least partly through induction of apoptosis. The precise role of CD274 on second passage ASC has yet to be determined, but CD274-positive bone marrow MSCs, manually expanded with FBS, regulate T-cell proliferation and Th17 polarization, and have demonstrated comparable effects upon INFgamma licensing.

Also of note is an increase in MFI from 3 to 97 for the marker CD54 (ICAM-1) which illustrates the mobilisation of an intercellular adhesion molecule necessary for the stabilisation of ASC-leukocyte interactions and signal transduction. ICAM-1 is a ligand for LFA-1 (integrin), a receptor found on leukocytes.

The significant upregulation of HLA DR/DP/DQ is expected, but in context of a lack of upregulation of known co-stimulatory markers CD40, CD80 and CD86, an antigen-presenting phenotype is not obtained. Rather the simultaneous significant upregulation of CD274 and the persistent expression of other immunosuppressive markers is consistent with the net output being anti-inflammatory (Krampera et al., 2013; Galipeau et al., 2016)

The ability to phenotypically and functionally respond to the environment is critical for the products ability to interact with the in vivo environment into which cells are injected upon treatment. This inherent interactive trait of the product is significant for its characteristics and its clinical efficacy. The ability to take on an immunosuppressive phenotype permits and explains allogeneic use.

Example 12

Clinical Study 10 patients age 62.5±6.6 years (mean±SD) with chronic ischemic heart disease and heart failure, reduced left ventricular EF (5.45%), New York Heart Failure (NYHA) class without any further revascularization options and on maximal tolerable medical therapy have been treated with the final product CSCC_ASC. With a NOGA Myostar® catheter (Biological Delivery System, Cordis, Johnson & Johnson, USA) approximately 15 injections of 0.3 mL CSCC_ASC prepared according to Example 1, were injected into viable myocardium in the border zone of infarcted area.

Patients had a cardiac ECHO and CT scan with contrast at baseline and after six months.

A 320-multidetector CT scanner (Aquilion One, Toshiba Medical systems Corporation, Otawara, Japan) was used to perform a cardiac CT scans. The R-R interval and multi-segmental image reconstruction was performed with the scanner software. Images were reconstructed with 0.5 mm slice thickness and increments of 0.25 mm in 2% interval in the prospective window.

ECHO was measuring cardiac function and volumes in parasternal and apical views.

All image data was analyzed with the cvi post-processing tool (Circle Cardiovascular Imaging, Calgary, Alberta, Canada). Endocardial and epicardial borders were traced manually in end-diastole and end-systole and the mitral plane set to define the basal border of the LV.

The New York Heart Association (NYHA) Functional Classification was used. It places patients in one of four categories based on how much they are limited during physical activity with regard to shortness of breath.

The 6 minutes walking test (6MWT) was standardized according to the American Thoracic Society guideline March 2002 using a 30 m long (100 ft) hallway or corridor. The Borg CR10 Scales was used for measuring intensity of experience.

TABLE 18

| | Clinical efficacy | | | | 95% Confidence Interval | | |
|---|---|---|---|---|---|---|---|
| | Number of patients | Base Before treatment | 6 months After treatment | Difference | SD | Lower | Upper | p |
| LVEF | 9 | 28.8% | 31.7% | 2.9% | 4.1 | 0.2 | 6.1 | 0.065[a] |
| LVESV | 9 | 205 mL | 182 mL | 23 mL | 34 | −3 | 49 | 0.073[a] |
| 6MWT | 8 | 460 m | 495 m | 35 m | 14 | 24 | 47 | <0.0001 |
| NYHA | 10 | 2.8 | 2.2 | 0.6 | 0.8 | 0 | 1.2 | 0.063[b] |

[a]Paired T-test
[b]Wilcoxon Signed Ranks Test

Six months after treatment, Left Ventricular Ejection Fraction (LVEF) and 6MWT was improved while Left Ventricular End Systolic Volume (LVESV) and NYHA score had decreased. Measures reveal improved pump function of the heart, increased working capacity and fewer attacks of shortness of breath. Treatment was safe and efficacious.

Example 13

Surface Adherence of ASCs

One inherent characteristic defining an ASC population it the ability of ASCs to adhere. In addition ability to adhere is the first of many traits demonstrating that ASCs have maintained normal cell function. In this Example, the ability to adhere of ASCs from the product CSCC_ASC, produced as described in Example 1 after storage in dry-storage liquid nitrogen containers at −180° C. for up to 12 months was studied. Briefly, ASCs from three donors, prepared according to Example 1 were stored for 1, 3, 6 and 12 months, thawed, counted and put in to in vitro culture, 1 million viable cells per flask in αMEM with 5% HPL for 5 hours. After 5 h cultures were washed, and the adherent population was detached with TrypleSelect and counted.

Table 19 A, B and C

TABLE 19a

Percent ASCs attached after 5 h in vitro compared to number seeded
(1 million viable freeze-thawed cells from CSCC_ASC seeded)

| | Months storage | | | |
|---|---|---|---|---|
| Donor | 1 | 3 | 6 | 12 |
| BO03 | | | | 77% |
| PE04 | 80% | | 76% | |
| LA09 | 84% | 92% | 74% | |

TABLE 19b

Viability of ASCs in CSCC_ASC vials before seeding

| | Months storage | | | |
|---|---|---|---|---|
| Donor | 1 | 3 | 6 | 12 |
| BO03 | | | | 93% |
| PE04 | 95% | | 93% | |
| LA09 | 92% | 97% | 96% | |

TABLE 19c

Percent ASCs in vials able to adhere within 5 hr in vitro

| | Months storage | | | |
|---|---|---|---|---|
| Donor | 1 | 3 | 6 | 12 |
| BO03 | | | | 72% |
| PE04 | 76% | | 71% | |
| LA09 | 77% | 89% | 71% | |

The ability to adhere to a surface is an important ASC characteristic. The product CSCC_ASC presents with a high degree of maintained ASC adhesiveness after freezing, storage and thawing.

If stored in $N_2$ dry-storage containers at −180° C. for up till 12 months, between 71 and 89% (mean: 76%) of cells maintain functional ability to adhere.

Example 14

Surface Markers

Cells produced as described in Example 1 were characterized as described in Example 2, except for using a single-color flow cytometry protocol, yielding the results shown in the Table 20 below for first passage ASCs (8 batches) and second passage ASCs (14 batches).

In short, cells were analyzed directly after harvest and before cryopreservation. For flow cytometry cells were washed with PBS, adjusted to 1 million cells per ml and labelled with the viability stain FVS-780 (Becton Dickinson) for 10 minutes at RT in the dark. FVS-780 was washed out with PBS containing FBS, cell suspension was filtered and antibodies were added for 30 min at RT in the dark and in volumes according to prior titration. All antibodies used were from Becton Dickinson and conjugated with fluorochromes PE (Phycoerythrin), Brilliant Violet 510, FITC (fluorescein isothiocyanate), APC (Allophycocyanin) and PerCp-Cy5.5 (Peridinin-chlorophyll tandem). Dead cells and doublets were excluded from the final analysis. Data was collected and analysed using a GMP compliant Navios (Beckman Coulter, Germany Data was analysed using Navios software and Kaluza (Beckman Coulter, Germany).

TABLE 20

| Marker | Percentage of ASC population First passage n = 8 batches | | | Percentage of ASC population Second passage n = 14 batches | | |
|---|---|---|---|---|---|---|
|  | Mean | Minimum | Maximum | Mean | Minimum | Maximum |
| Viability | 93.6 | 84.5 | 97.5 | 95.6 | 90.3 | 98.4 |
| CD45 | 0.9 | 0.3 | 2.7 | 0.2 | 0.1 | 0.4 |
| HLA-DR | 0.4 | 0.2 | 0.8 | 0.1 | 0.0 | 0.2 |
| CD14 | 1.1 | 0.2 | 2.9 | 0.3 | 0.1 | 1.3 |
| CD31 | 1.0 | 0.3 | 1.6 | 0.2 | 0.1 | 0.6 |
| CD34 | 8.0 | 3.0 | 15.8 | 9.5 | 0.1 | 34.5 |
| CD36 | 15.6 | 9.7 | 27.2 | 6.9 | 3.5 | 11.3 |
| CD106 | 4.6 | 0.4 | 9.8 | 2.1 | 0.1 | 7.4 |
| CD146 | 32.4 | 9.1 | 52.7 | 31.0 | 12.3 | 52.0 |
| CD13 | 99.3 | 99.2 | 99.7 | 99.7 | 99.2 | 100.0 |
| CD29 | 96.7 | 95.0 | 98.3 | 97.1 | 93.1 | 99.8 |
| CD73 | 99.1 | 99.0 | 99.6 | 99.8 | 99.6 | 100.0 |
| CD90 | 98.8 | 95.8 | 99.7 | 99.5 | 96.9 | 99.9 |
| CD105 | 97.7 | 95.9 | 99.5 | 96.5 | 88.5 | 99.9 |
| CD166 | 97.8 | 97.1 | 99.5 | 99.7 | 99.1 | 100.0 |

Table 20 shows percentages of ASCs after first and second passages expressing named surface markers used for characterization of ASCs. Mean expression values are based on 8 and 14 batches for first passage and second passages, respectively. Minimum and maximum expression levels are also shown.

LIST OF REFERENCES

Bourin P, et al. Cytotherapy. 2013 June; 15(6): 641-648.
Camilleri et al. Stem Cell Research & Therapy (2016) 7:107
Dominici M, et al. Cytotherapy (2006) Vol. 8, No. 4, 313-317.
Ekblond A. Presentation at the International Congress on Adipose Stem Cell Treatments 2015 (iCAST2015).
Follin B, et al. Cytotherapy. 2015 August; 17(8):1104-18).
Gebler A, et al. Trends in Molecular Medicine 18.2 (2012): 128-134.
Jensen S S and Gad M. J Inflamm (Lond) 2010; 7:37.
Krampera et al., Cytotherapy, 2013; 15:1054-1061
Mathiasen A B, et al. Am Heart J. 2012 164(3):285-91.
Mathiasen A B, et al. Int J Cardiol. 2013 170(2):246-51.
Qayyum A A, et al. Regen Med. 2012 7(3):421-8.
Wang Y, et al. Nature Immunology 15.11 (2014): 1009-1016.
WO 2014/203267 A2 (Kaziak Research PVT Ltd.)
WO 2006/037649 A1 (Cellerix S. L. and Universidad Autónoma de Madrid)
WO 00/02572 A1 (Baust J. G.)
WO 2010/064054 A1 (Reneuron Ltd.)

The invention claimed is:

1. A cell bank comprising a plurality of vials stored under freezing conditions, each vial comprising a pharmaceutical composition comprising a suspension of an immunosuppressive adult human adipose-tissue derived stem cell (ASC) population in a protein-free cryoprotectant at a concentration in the range of $1.5 \times 10^7$ cells per mL to $5 \times 10^7$ cells per mL,
    wherein at least 80% of the ASC population express CD90, CD105, CD13, CD73, CD166, and CD29, and at most 15% of the ASC population express CD45, CD31, CD14, and CD19,
    wherein immediately after thawing a vial at least 80% of the stem cell population are viable cells, and
    wherein the protein-free cryoprotectant comprises a 1:10 to 1:20 mixture of dimethyl sulfoxide (DMSO) and an aqueous solution comprising:
    (a) one or more electrolytes selected from the group consisting of potassium ions at a concentration ranging from 35-45 mM, sodium ions ranging from 80-120 mM, magnesium ions ranging from 2-10 mM, and calcium ions ranging from 0.01-0.1 mM;
    (b) a macromolecular oncotic agent selected from the group consisting of a polysaccharide and colloidal starch;
    (c) a biological pH buffer;
    (d) at least one of sucrose and glucose;
    (e) mannitol;
    (f) at least one impermeant anion selected from the group consisting of lactobionate, gluconate, citrate and glycerophosphate;
    (g) at least one member selected from the group consisting of adenosine, fructose, ribose and adenine; and
    (h) glutathione.

2. The cell bank of claim 1, wherein at least about 80% of the ASC population express CD90, CD73, CD13, CD105, CD29, CD166, CD10, CD140b, CD160, CD204, CD272, CD44, CD49a, CD54, CD9, Galectin 3, Galectin 9, HLA-G and LTβR and at most about 15% of the ASC population express CD45, CD19, CD14, CD106, CD31 and CD36.

3. The cell bank of claim 1 wherein, of the ASC population,
    at least 90% express CD90, CD73, CD13, CD29 and CD166; at most 5% express CD45, CD19, CD14 and CD31; at most 10% express CD106; between 2 and 15% express CD36; at least 10% express CD146; at least 80% express CD105 and at most 40% express CD34; and/or
    at least 90% express CD10, CD140b, CD160, CD204, CD272, CD44, CD54, CD9, Galectin 3, Galectin 9, HLA-G and LTβR; at least 80% express CD49a; at least 60% express CD258 and CD270 and at least 5% express CD200; at most 15% express CD15, CD152, CD163, CD18, CD274, CD39, CD40, CD62L, CD80 and CD86; and at most 30% express CXCR4.

4. The cell bank of claim 1 wherein, after thawing of a vial, the ASC population is such that upon interferon-gamma stimulation comprising cultivation for 3 days in the presence of 50 ng/ml interferon-gamma, the percentage of the ASC population expressing CD274 is increased to at least 80% and the expression level of CD54 on CD54-positive cells is increased at least 25-fold as compared to a control ASC population cultivated for 3 days in the absence of interferon-gamma.

5. The cell bank of claim 1, wherein, immediately after thawing, the ASC population in a vial of the pharmaceutical composition is capable of a population doubling of at least 1 when cultured for 48 hours.

6. The cell bank of claim 1, wherein each vial comprises about 5 mL of the pharmaceutical composition and wherein the cell concentration is in the range of about $2.0 \times 10^7$ to about $2.5 \times 10^7$ cells per mL.

7. A process for preparing a pharmaceutical composition comprising an adult human stem cell population,
wherein at least 80% of the stem cell population express CD90, CD105, CD13, CD73, CD166, and CD29, and at most 15% of the stem cell population express CD45, CD31, CD14, and CD19,
said process comprising the steps of
(i) adding the stromal vascular fraction (SVF) of a lipoaspirate collected from a donor to a bioreactor wherein at least one surface is pre-treated to promote adhesion of adult human stem cells;
(ii) in the bioreactor, cultivating adherent cells to confluence in a serum-free culture medium supplemented with human platelet lysate;
(iii) detaching the adherent cells;
(iv) freezing the detached cells in a protein-free cryoprotectant at a concentration of at least $1 \times 10^6$ cells/mL;
(v) thawing the frozen cells and repeating steps (ii) and (iii), and optionally (iv), once, twice, or three times;
(vi) freezing the detached cells at a concentration of at least $1.5 \times 10^7$ cells/mL; and
(vii) prior to clinical use, thawing the frozen composition
thereby obtaining the pharmaceutical composition, wherein immediately after thawing a vial at least 80% of the stem cell population are viable cells,
wherein the protein-free cryoprotectant comprises a 1:10 to 1:20 mixture of DMSO and an aqueous solution comprising:
(a) one or more electrolytes selected from the group consisting of potassium ions at a concentration ranging from 35-45 mM, sodium ions ranging from 80-120 mM, magnesium ions ranging from 2-10 mM, and calcium ions ranging from 0.01-0.1 mM;
(b) a macromolecular oncotic agent selected from the group consisting of a polysaccharide and colloidal starch;
(c) a biological pH buffer;
(d) at least one of sucrose and glucose;
(e) mannitol;
(f) at least one impermeant anion selected from the group consisting of lactobionate, gluconate, citrate and glycerophosphate;
(g) at least one member selected from the group consisting of adenosine, fructose, ribose and adenine; and
(h) glutathione.

8. The process of claim 7, wherein
a) at least one surface of the bioreactor is pre-treated with a composition comprising or consisting of cryoprecipitate;
b) the culture medium comprises from about 2% to about 15% human platelet lysate;
c) in step (v), thawing the frozen cells and repeating steps (ii) and (iii) is carried out once; or
d) a combination of any two or more of (a) to (c).

9. A pharmaceutical composition comprising a suspension of an adult human adipose-tissue derived stem cell (ASC) population in a protein-free cryoprotectant, at a concentration in the range of $1.5 \times 10^7$ cells per mL to $5 \times 10^7$ cells per mL,
wherein at least 80% of the ASC population express CD90, CD105, CD13, CD73, CD166, and CD29, and at most 15% of the ASC population express CD45, CD31, CD14, and CD19, and
wherein the composition is obtained or obtainable according to a process comprising the steps of
(i) adding the stromal vascular fraction (SVF) of a lipoaspirate collected from a donor to a bioreactor wherein at least one surface is pre-treated to promote adhesion of adult human stem cells;
(ii) in the bioreactor, cultivating adherent cells to confluence in a serum-free culture medium supplemented with human platelet lysate;
(iii) detaching the adherent cells;
(iv) freezing the detached cells in a protein-free cryoprotectant at a concentration of at least $1 \times 10^6$ cells/mL;
(v) thawing the frozen cells and repeating steps (ii) and (iii), and optionally (iv), once, twice, or three times,
(vi) freezing the detached cells at a concentration in the range of $1.5 \times 10^7$ cells/mL to $5 \times 10^7$ cells/mL; and
(vii) prior to clinical use, thawing the frozen composition,
thereby obtaining the pharmaceutical composition, wherein immediately after thawing a vial at least 80% of the stem cell population are viable cells,
wherein the protein-free cryoprotectant comprises a 1:10 to 1:20 mixture of DMSO and an aqueous solution comprising:
(a) one or more electrolytes selected from the group consisting of potassium ions at a concentration ranging from 35-45 mM, sodium ions ranging from 80-120 mM, magnesium ions ranging from 2-10 mM, and calcium ions ranging from 0.01-0.1 mM;
(b) a macromolecular oncotic agent selected from the group consisting of a polysaccharide and colloidal starch;
(c) a biological pH buffer;
(d) at least one of sucrose and glucose;
(e) mannitol;
(f) at least one impermeant anion selected from the group consisting of lactobionate, gluconate, citrate and glycerophosphate;
(g) at least one member selected from the group consisting of adenosine, fructose, ribose and adenine; and
(h) glutathione.

10. The cell bank of claim 1, wherein the ASC concentration is between $2 \times 10^7$ cells and $5 \times 10^7$ cells per mL.

11. The pharmaceutical composition according to claim 9, wherein
- a) at least one surface of the bioreactor is pre-treated with a composition comprising or consisting of cryoprecipitate;
- b) the culture medium comprises from about 2% to about 15% human platelet lysate;
- c) in step (v), thawing the frozen cells and repeating steps (ii) and (iii) is carried out once; or
- d) a combination of any two or more of (a) to (c).

12. The cell bank of claim 10, wherein the ASC concentration is from $2.0 \times 10^7$ to $2.4 \times 10^7$ cells per mL.

13. The cell bank of claim 10, wherein the ASC concentration is $5 \times 10^7$ cells per mL.

* * * * *